United States Patent
Nakayama et al.

(10) Patent No.: US 7,792,163 B2
(45) Date of Patent: Sep. 7, 2010

(54) HARMONIC GENERATOR AND AN IMAGE DISPLAY DEVICE USING THE HARMONIC GENERATOR

(75) Inventors: Kenji Nakayama, Osaka (JP); Kiminori Mizuuchi, Osaka (JP); Hiroyuki Furuya, Nara (JP); Akira Kurozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/043,787

(22) Filed: Mar. 6, 2008

(65) Prior Publication Data
US 2008/0219302 A1 Sep. 11, 2008

(30) Foreign Application Priority Data
Mar. 7, 2007 (JP) ............................. 2007-056992

(51) Int. Cl.
*H01S 3/10* (2006.01)
*H01S 3/098* (2006.01)
*G02F 2/02* (2006.01)

(52) U.S. Cl. .............................. 372/21; 372/22; 372/18; 359/328

(58) Field of Classification Search ................... 372/21, 372/22, 18; 347/256; 359/328
See application file for complete search history.

(56) References Cited

U.S. PATENT DOCUMENTS

| 5,198,837 | A * | 3/1993 | Ikshizaka et al. | 347/256 |
| 2003/0109860 | A1 * | 6/2003 | Black | 606/10 |
| 2005/0238069 | A1 * | 10/2005 | Ohkubo et al. | 372/21 |
| 2006/0280219 | A1 * | 12/2006 | Shchegrov | 372/99 |

FOREIGN PATENT DOCUMENTS

| JP | 3-208387 | 9/1991 |
| JP | 7-36072 | 2/1995 |
| JP | 2006-267377 | 10/2006 |

* cited by examiner

*Primary Examiner*—Minsun Harvey
*Assistant Examiner*—Patrick Stafford
(74) *Attorney, Agent, or Firm*—Wenderoth, Lind & Ponack, L.L.P.

(57) ABSTRACT

It is aimed to suppress a local increase of an energy density per unit time in a nonlinear crystal. A fundamental wave emitted from a fundamental wave laser light source is condensed by a condenser lens and incident on a nonlinear crystal 11 having a poled structure. By displacing a focus position of a fundamental wave 50 by means of a scanning mirror 21, a local increase of the energy density per unit time in the nonlinear crystal 11 is suppressed.

19 Claims, 29 Drawing Sheets

HARMONIC GENERATOR AND AN IMAGE DISPLAY DEVICE USING THE HARMONIC GENERATOR

BACKGROUND OF THE INVENTION

1. Field of the Invention

The present invention relates to a harmonic generator for obtaining a harmonic by converting a wavelength and a like image display device using the harmonic generator such as a video projector, a television receiver or a liquid crystal panel.

The present invention particularly relates to a harmonic generator for obtaining a high-output harmonic.

2. Description of the Background Art

A nonlinear crystal having a poled structure is used as a laser wavelength conversion element utilizing its nonlinear optical effect. For example, if a laser light having a wavelength of 1064 nm, which is the wavelength of infrared rays, is incident on a nonlinear crystal having a poled structure, a green laser light having a wavelength of 532 nm can be obtained as a second harmonic. Particularly, since the medium of a semiconductor laser for outputting a green wavelength light is yet to be found, the nonlinear crystal having the poled structure can be said to be one of important technologies for obtaining a green laser.

In recent years, image display devices using lasers as light sources have gathered attention. Since a laser light as a coherent light has strong monochromaticity, an image display device having a high color purity and an excellent color reproducibility can be realized by selecting a laser having a suitable wavelength as a light source. Three primary colors of light are red, blue and green. Green lasers are important because green is one of the three primary colors. Accordingly, in order to realize an image display device having higher luminance, improvements in the efficiency and output of a laser are indispensable. Thus, it is expected to realize a high-efficiency and high-output green laser. It also asked for to realize a high-luminance image display and a high-quality image display.

FIG. 23 shows the construction of a harmonic generator for generating a second harmonic using a nonlinear crystal 11 having a poled structure. The harmonic generator is provided with a laser light source 10 for generating a fundamental wave 50, a condenser lens 20 for condensing the fundamental wave 50 and the nonlinear crystal 11 on which the fundamental wave 50 condensed by the condenser lens 20 is incident. The fundamental wave 50 and a second harmonic 51 are emitted from the nonlinear crystal 11. It is known that an output of the second harmonic 51 is proportional to a square of the energy density of the incident laser light (fundamental wave) per unit area in the case of obtaining the second harmonic 51 from the nonlinear crystal 11 having a poled structure. However, the light quantity of the laser light absorbed by the nonlinear crystal 11 increases as the energy density of the laser light in the nonlinear crystal is increased. As a result, temperature increases in parts of the nonlinear crystal 11 where the laser light passes or which is near the focus of the laser light, whereby temperature is locally high at the respective parts in a temperature distribution in the nonlinear crystal 11. Upon a temperature change in the nonlinear crystal 11, the phase matching condition of the nonlinear crystal 11 deviates from a proper one as a refractive index in the nonlinear crystal 11 changes, with the result that a harmonic generation efficiency decreases. Further, if the energy density of the laser light is excessively high, the nonlinear crystal 11 is damaged due to a temperature increase therein.

In a harmonic generator including a laser light source and a nonlinear crystal having a poled structure, the positional relationship of the laser light source and the nonlinear crystal has been conventionally relatively always constant. Thus, if temperature becomes locally high in a temperature distribution in the nonlinear crystal for the above-described reason, a harmonic generation efficiency invariably decreases. As a method for solving this problem, it has been proposed to suppress a local temperature increase in a nonlinear crystal by displacing a laser optical path parallelly to or perpendicularly to an optical axis as disclosed in Japanese Unexamined Patent Publication No. H03-208387. FIGS. 24, 25 and 26 show typical constructions for such a method. FIG. 24 shows the construction for oscillating a laser light passing through a nonlinear crystal 11 by oscillating a scanning mirror 21. A fundamental wave emitted from a laser light source 10 is incident on the nonlinear crystal 11 after being reflected by the scanning mirror 21 and having an incident angle thereof on the nonlinear crystal 11 kept constant by a condenser lens 20. The oscillation of the laser optical path can be realized by oscillating optical elements such as a lens and a mirror or oscillating the nonlinear crystal 11 itself.

FIG. 25 shows the construction for oscillating a laser optical path by rotating a prism 28. A laser light oscillates in a direction perpendicular to an optical axis while having an incident angle thereof on a nonlinear crystal 11 kept constant by passing through the rotating prism 28. FIG. 26 shows the construction for oscillating a nonlinear crystal itself. The nonlinear crystal 11 is mounted on a vertical direction oscillator 24 that oscillates in the direction perpendicular to the optical axis. In the case of oscillating either the laser optical path or the nonlinear crystal 11, resonance (oscillation at a natural frequency) is generally used in consideration of the amplitude of oscillation and an energy to be consumed. By using the resonance, oscillation having a low consumption energy and a large amplitude is possible.

There is also a construction for causing a laser optical path to make a circular movement at a constant speed about an axis parallel to an optical axis as disclosed in Japanese Unexamined Patent Publication No. H07-36072. In the case of a nonlinear crystal having a poled structure, the position of a laser light passing through this crystal is of considerable significance to obtain a high conversion efficiency. Particularly, the displacement of the position of the laser light in the depth direction of the nonlinear crystal has a larger influence on the conversion efficiency than the one in the width direction of the nonlinear crystal. This results from the poling interval of the nonlinear crystal.

Specifically, since the poled structure is grown from a surface in the formation procedure of the nonlinear crystal, the growth of poles are larger toward the surface to decrease the poling interval as shown in FIG. 27. On the contrary, the more distant from the surface of the nonlinear crystal, the larger the poling interval. In the case of obtaining a harmonic from the nonlinear crystal, a suitable poling interval is necessary, but an irradiation range of the laser light for obtaining the suitable interval has a limited width in the depth direction of the nonlinear crystal. Thus, if an actual irradiated position of the laser light largely deviates from the irradiation range for obtaining the suitable interval, the harmonic generation efficiency decreases. This is described in detail with reference to FIG. 28 showing a relationship between the displacement of the irradiated position of the laser light in the depth direction and the harmonic conversion efficiency. If y1 denotes the maximum conversion efficiency of the laser light, it is necessary to irradiate the laser light within a range of ±100 μm in the depth direction from an optimal irradiated position x1 of the laser light in order to obtain an efficiency of 90% ($0.9 \times y1$) or higher of the maximum conversion efficiency $y1$. Further, in order to obtain an efficiency of 50% ($0.5 \times y1$) or higher of the maximum conversion efficiency $y1$, it is necessary to irradiate the laser light within a range of ±250 μm in the depth direction from the optimal irradiated position $x1$ of the laser light.

On the other hand, even if the irradiated position of the laser light is displaced in the width direction (see FIG. 27) of the nonlinear crystal, the poling interval in the irradiation range of the laser light does not largely vary, wherefore the distance of the irradiated position of the laser light in the width direction has a little influence on the conversion efficiency. Since we use a nonlinear crystal with a poled structure having a width of 1 mm (inclusive) to 26 mm (inclusive), a ratio of the width to the depth of the irradiation range of the laser light to obtain a conversion efficiency of 90% or higher is 5:1 to 130:1. In other words, a permissible displacement range of the irradiated position of the laser light in the depth direction of the nonlinear crystal is significantly smaller than the one in the width direction of the nonlinear crystal. In the case of causing the laser optical path to make a circular motion, the irradiated position is displaced by the same amount both in the depth direction and in the width direction of the element. Accordingly, an increase in the displacement of the laser optical path in the construction adopting the circular motion leads to an increase of the displacement in the depth direction to vary the poling interval, thereby causing a problem of reducing the conversion efficiency. This point was not considered in the patent literature 2.

There has been also proposed a method for adjusting an energy density by displacing the focus position of a laser light in an element as disclosed in Japanese Unexamined Patent Publication No. 2006-267377. Since a second harmonic outputted from a nonlinear crystal is proportional to the square of the energy density of a fundamental wave per unit area, the laser light of the fundamental wave is generally incident on the nonlinear crystal by being condensed by a condenser lens. As shown in FIG. 30, a nonlinear crystal 11 is mounted on an optical-axis direction oscillator 22 movable in an optical axis direction. A device disclosed in this publication is constructed to prevent the damage of an element by the laser light by adjusting the focus position in the optical axis direction in accordance with the energy density of a light source for emitting the fundamental wave.

On the other hand, if a laser light is used as a light source for an image display device to realize the image display with higher quality, this leads to a problem that an interference pattern peculiar to laser called a speckle noise occurs. Specifically, since the laser light has a narrow spectral width and high coherency, the scattered laser lights randomly interfere with each other to cause a speckle noise in the form of fine particles. As a method for reducing the speckle noise, there are generally known a method for swinging a passing laser light by swinging an optical element such as a diffuser plate and a method for swinging a screen on which a video is projected. If either one of these methods is used, the phase distribution of light on the screen varies and the fine pattern of the speckle noise also changes with time. If the pattern of the speckle noise changes faster than an afterimage time of an observer, the observer senses as a noise-free image since the speckle noise is time-averaged by the eyes of the observer.

The above-described conventional method for displacing the laser light intends to prevent such a phenomenon that the nonlinear crystal absorbs the laser light, thereby causing a temperature increase of the nonlinear crystal to damage the nonlinear crystal.

However, with the higher efficiency and higher output of the laser light, the damage of the nonlinear crystal cannot be sufficiently prevented by the conventional method, which has caused a problem that no stable laser light can be obtained.

On the other hand, in order to realize an image display device with a high image quality, the speckle noise is reduced by displacing the phase of the laser light through the movement of the optical element or by displacing the phase of the laser light through the movement of the projection screen. However, since the optical element and the screen generally reduce the noise through the resonance, noise generation and the like have been problematic depending on the amplitude of the resonance.

SUMMARY OF THE INVENTION

An object of the present invention is to solve the above problems and provide a harmonic generator capable of obtaining a high-output harmonic using a laser light source and an image display device with high luminance and high image quality.

In order to solve the above problem, one aspect of the present invention is directed to a harmonic generator, comprising a laser light source for generating a laser light; a condensing member for condensing the laser light; a nonlinear crystal having a poled structure formed to be phase-matched with the laser light condensed by the condensing member; and a displacing member for relatively displacing a focus position of the laser light from the condensing member and the nonlinear crystal, wherein the displacing member relatively displaces the focus position and the nonlinear crystal such that, within an irradiation range set in the poled structure and having dimensions in a first direction parallel to an optical axis of the laser light from the condensing member and a second direction orthogonal to the first direction longer than a dimension in a third direction orthogonal to the first and second directions, the focus position of the laser light is oscillated at least in one of the first and second directions without stopping at the same position for longer than a predetermined period.

Another aspect of the present invention is directed to a harmonic generator, comprising a laser light source for generating a laser light; a nonlinear crystal having a poled structure formed to be phase-matched with the laser light; a displacing member for relatively displacing a focus position of the laser light and the nonlinear crystal such that an optical path of the laser light moves in the poled structure; and power control means for controlling the power of the laser light in accordance with a relative displacement speed of the optical path of the laser light and the nonlinear crystal such that a power density in the poled structure is equal to or below a predetermined value.

Still another aspect of the present invention is directed to a harmonic generator comprising a laser light source for generating a laser light; a nonlinear crystal having a poled structure formed to be phase-matched with the laser light; and a displacing member for switching an optical path of the laser light relative to the nonlinear crystal in the poled structure of the nonlinear crystal in such a manner as not to stop the optical path of the laser light at the same position for longer than a predetermined period.

Further another aspect of the present invention is directed to an image display device, comprising the above harmonic generator; a spatial modulation element for converting a laser light generated by the harmonic generator into an image; and a display controller for controlling an image conversion by the spatial modulation element.

According to the present invention, a harmonic generator capable of obtaining a high-output harmonic using a laser light source and an image display device with high luminance and high quality can be provided.

These and other objects, features, aspects and advantages of the present invention will become more apparent upon a reading of the following detailed description and accompanying drawings.

DESCRIPTION OF THE PREFERRED EMBODIMENTS

Figure 1:
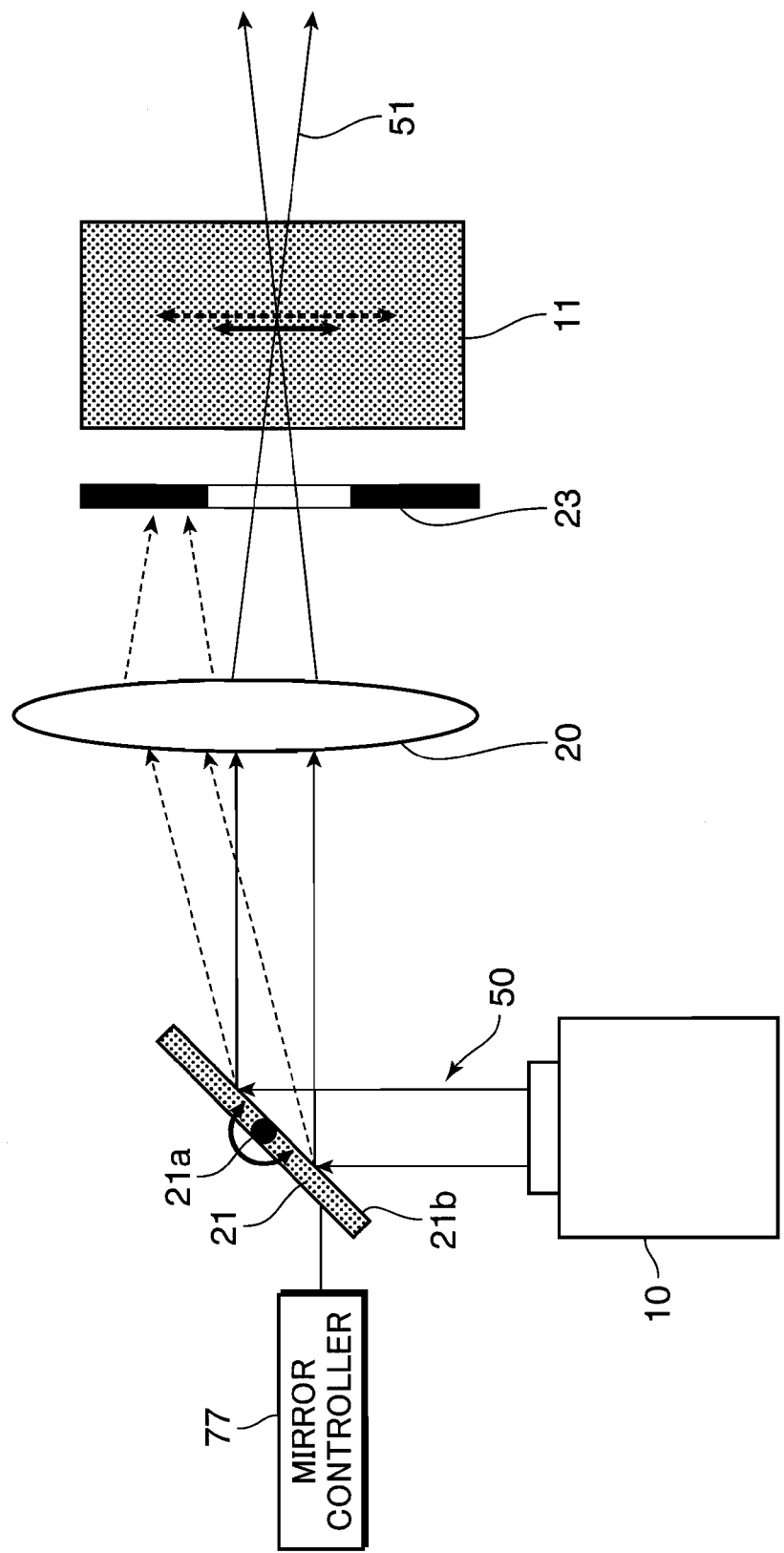
FIG. 1 is a diagram of a harmonic generator according to a first embodiment of the invention including an element for shielding a laser light.

Hereinafter, embodiments of the present invention are described with reference to the accompanying drawings. It should be noted that the following embodiments are specific examples of the present invention and are not of the nature to limit the technical scope of the present invention.

First Embodiment

A crystal damaging mechanism (UVIGA: Ultra Violet Induced Green Absorption) different from the conventional one and found by the present inventors with the higher efficiency and higher output of laser lights is first described.

It was found out that, upon the wavelength conversion of a fundamental wave having a wavelength of 1064 nm into a second harmonic that is a green light having a wavelength of 532 nm by a Mg-doped $LiNbO_3$ (hereinafter referred to as "PPMgLN") that is a nonlinear crystal having a periodic poled structure, the output of the green light became unstable and a damage by a laser light was caused in the nonlinear crystal if the output of the green light exceeded 3 W. As a result of investigation of its cause, the following phenomenon was revealed.

Upon converting the fundamental wave having a wavelength of 1064 nm into the second harmonic having a wavelength of 532 nm by the PPMgLN, an ultraviolet light having a wavelength of 355 nm is generated in the PPMgLN by the sum frequency of the fundamental wave and the second harmonic. Upon the generation of the ultraviolet light, an absorbed amount of the green light increases in a part of the PPMgLN irradiated with the ultraviolet light and the harmonic output becomes unstable by the thermal lens effect of a part of the PPMgLN irradiated with the green light. Further, if an energy density in the PPMgLN increases, the PPMgLN is damaged. This phenomenon is an unstable phenomenon different from a phenomenon in which an element simply absorbs a laser light and the refractive index thereof is changed by the heat of the laser light and a phenomenon in which an element is damaged with the heat of a laser light as a direct cause.

This phenomenon is more generally described. By a fundamental wave incident on a nonlinear crystal and a second harmonic wavelength-converted by the nonlinear crystal, the sum frequency of the fundamental wave and the second harmonic is generated although to a small extent. If this sum frequency is absorbed by the nonlinear crystal, the absorptance of the second harmonic by the nonlinear crystal increases. As a result of the absorption of the second harmonic, temperature in the nonlinear crystal increases to damage the nonlinear crystal. Up to now, the above phenomenon (this phenomenon is called UVIGA) has been confirmed when Mg-doped $LiNbO_3$ (PPMgLN) or Mg-doped $LiTaO_3$ composition is used as a nonlinear crystal having a poled structure. The Mg-doped $LiNbO_3$ and the Mg-doped $LiTaO_3$ are for obtaining a blue light having a wavelength of 532 nm (inclusive) to 535 nm (inclusive) or a blue light having a wavelength of 480 nm (inclusive) to 490 nm (inclusive) as a second harmonic.

Figure 29:
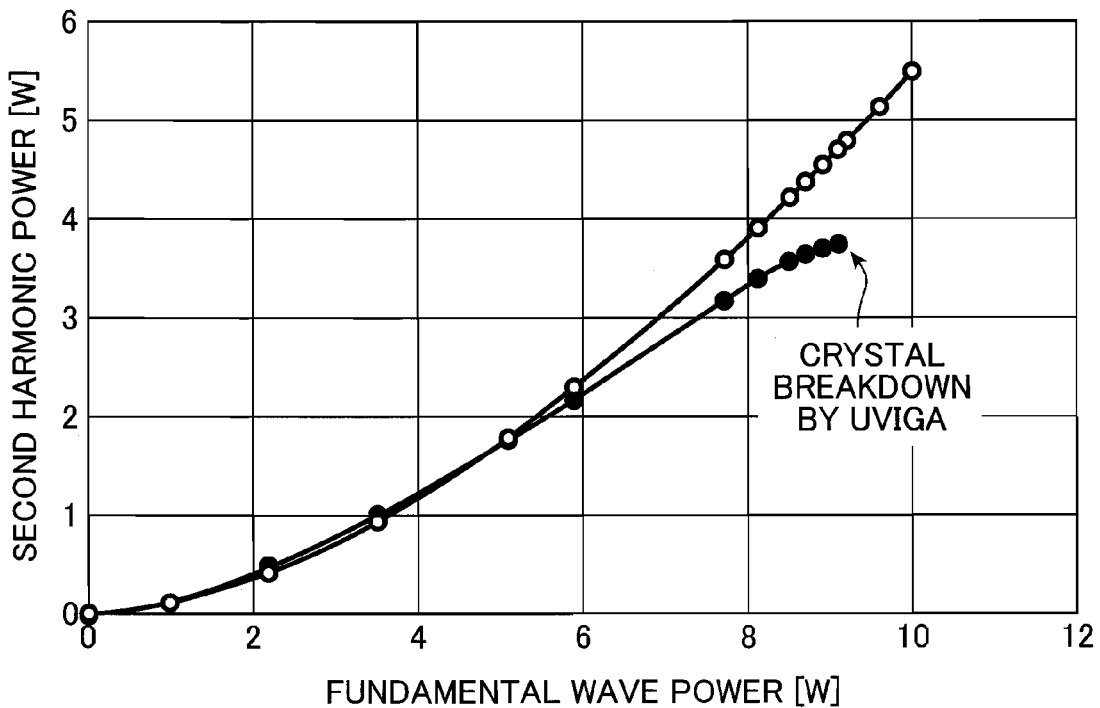
FIG. 29 is a graph showing an experimental result on crystal deterioration.

FIG. 29 shows the result of an experiment for obtaining a second harmonic using a nonlinear crystal with a poled structure. In FIG. 29, an X-axis represents the power of a fundamental wave to be inputted; a Y-axis the power of a second harmonic to be outputted; a curve with white circles a theoretical value; and a curve with black circles an experimental value. It can be understood from FIG. 29 that the experimental value largely deviates from the theoretical value if the output is equal to or above 2 W. This is because the UVIGA occurs and the second harmonic is absorbed by the nonlinear crystal. Although there are some differences depending on the type of the nonlinear crystal, breakdown by the UVIGA occurred to crack the nonlinear crystal when the power of the fundamental wave became 9 W and the output of the second harmonic became 3.8 W in this experiment. Next, for the comparison with a case where the nonlinear crystal is damaged with the absorption of the laser light as a direct cause, an experiment was conducted to change the power of the fundamental wave in a state where the fundamental wave and the poled structure are not phase matched, i.e. the second harmonic is not generated, in the same element. As a result, the crystal breakdown did not occur even if the fundamental wave exceeded 12 W. Since a beam diameter is on the same condition, the energy density of the fundamental wave causing the UVIGA can be said to be lower than that of the fundamental wave causing the damage with the absorption of the laser light as a direct cause from the above. This is a strict condition upon trying to obtain a high-output second harmonic.

In the case of adopting a method for avoiding a local temperature increase in a nonlinear crystal merely by oscillating a laser light as before, the crystal was damaged in a part where laser light rests still in the oscillation process of the laser light if an experiment was conducted using a high-output laser. In other words, it is important for the suppression of the UVIGA not to let the laser light rest sill in the poled structure. Specifically, it was found out that, upon observing a state of damage of the nonlinear crystal in the case of oscillating the laser light perpendicularly to the optical axis, the nonlinear crystal was damaged near turning ends of oscillation, i.e. near points where the laser light rests still. In other words, merely by oscillating the fundamental wave, the suppression of the UVIGA cannot be dealt with and the maximum output of the second harmonic might be decreased.

FIG. 1 shows a harmonic generator according to a first embodiment designed to suppress the UVIGA. The harmonic generator is provided with a laser light source 10 for generating a fundamental wave (laser light) 50, a nonlinear crystal 11 having a poled structure formed to be phase-matched with the fundamental wave 50, a condenser lens 20 for condensing the fundamental wave 50 and a displacing member for relatively displacing a focus position of the fundamental wave 50 by the condenser lens 20 and the nonlinear crystal 11.

The displacing member includes a scanning mirror 21 for reflecting the fundamental wave 50 emitted from the laser light source 10, a shielding element 23 disposed between the scanning mirror 21 and the nonlinear crystal 11 and a mirror controller 77 for controlling the driving of the scanning mirror 21.

The laser light source 10 is a fiber laser for emitting a harmonic having a wavelength of 1064 nm as a collimated beam.

The scanning mirror 21 is a galvanometer mirror capable of oscillating the focus position of the fundamental wave 50 in the width direction (second direction: see FIG. 27) of the nonlinear crystal 11 by swinging a reflecting surface 21b thereof about a shaft 21a.

The condenser lens 20 is a convex lens for condensing the fundamental wave 50 reflected by the scanning mirror 21. A beam waist (focus position) of the fundamental wave 50 by the condenser lens 20 is set substantially at a center position of the nonlinear crystal in a length direction (first direction: see FIG. 27). Thus, a conversion efficiency from the fundamental wave 50 into a second harmonic, which efficiency is dependent on the intensity of the fundamental wave 50, can be increased. Specifically, if a dimension of the nonlinear crystal 11 in the length direction is 26 mm, the positional relationship of the condenser lens 20 and the nonlinear crystal 11 is so adjusted as to set the focus position of the fundamental wave 50 near a position at a distance of 13 mm from an end surface of the nonlinear crystal 11 in the length direction.

A displacement distance of the focus position of the fundamental wave 50 by the scanning mirror 21 can be adjusted based on the amplitude of the scanning mirror 21 and a distance from the scanning mirror 21 to the condenser lens 20. In the first embodiment, the displacement distance of the focus position of the fundamental wave 50 is set longer than the width of the nonlinear crystal 11.

The shielding element 23 is designed to shield an optical path of the fundamental wave 50 when the focus position of the fundamental wave 50 is displaced to a turning point. Accordingly, the displaced fundamental wave 50 is incident on the nonlinear crystal 11.

Figure 27:
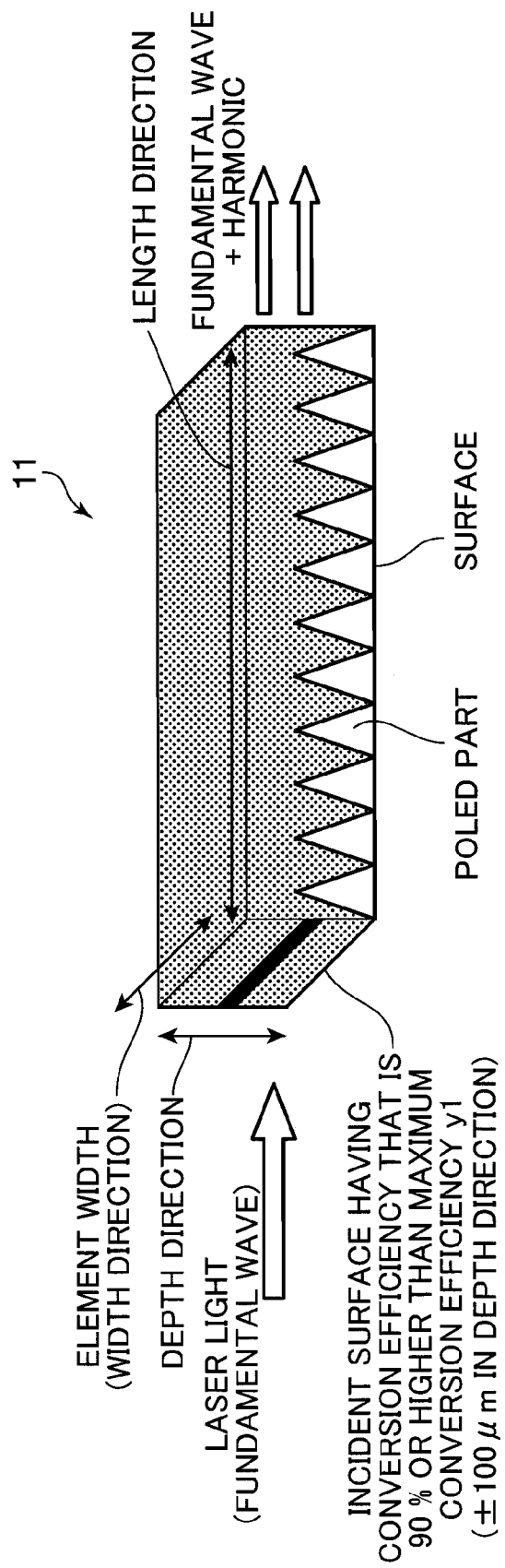
FIG. 27 is a diagram schematically showing a nonlinear crystal having a poled structure.
Figure 28:
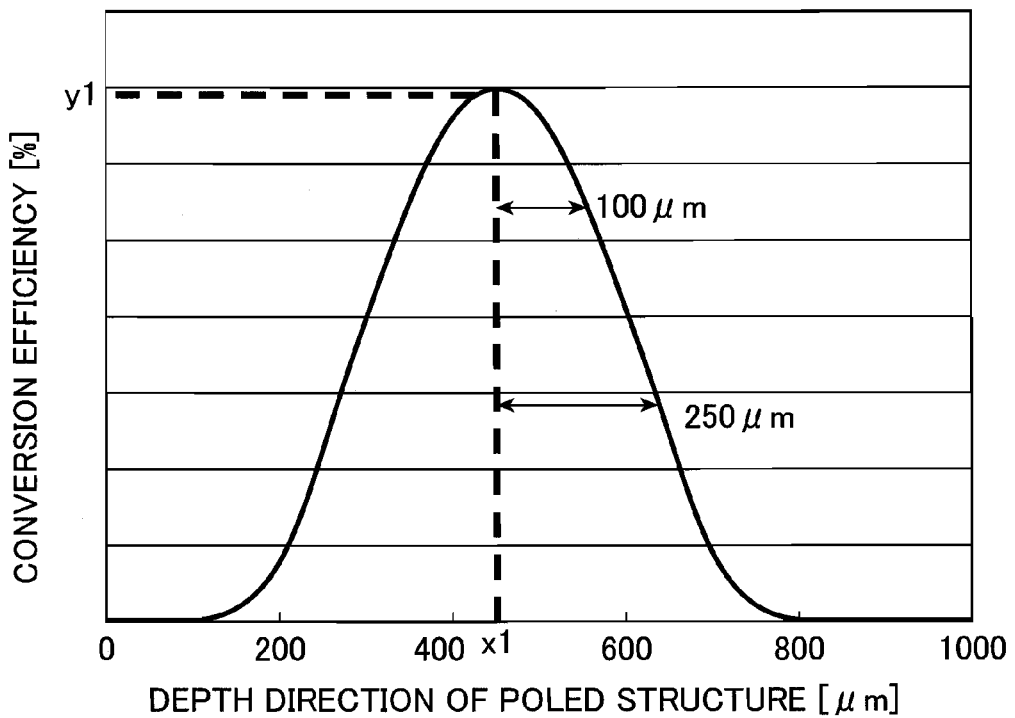
FIG. 28 is a graph showing a relationship between the depth direction of the nonlinear crystal having the poled structure and a harmonic conversion efficiency.

In the harmonic generator according to the first embodiment, an irradiation range of the nonlinear crystal 11 capable of efficiently obtaining the second harmonic is set. Specifically, this irradiation range is set such that the conversion efficiency y1 from the fundamental wave 50 into the second harmonic is 90% or higher, i.e. a range of the poled structure defined by a dimension (1 mm (inclusive) to 26 mm (inclusive)) in the width direction of the nonlinear crystal 11 and a dimension (200 μm) in the depth direction (third direction: see FIG. 27) of the nonlinear crystal 11 as shown in FIG. 27.

It should be noted that a dimension of the irradiation range of the nonlinear crystal 11 in the length direction (first direction) is set to be 26 mm.

The mirror controller 77 controls a swing speed (cycle) of the reflecting surface 21b of the scanning mirror 21. A method for determining a speed by the mirror controller 77 is described below.

The breakdown of the nonlinear crystal 11 by the UVIGA is thought to be determined by an amount of heat generation per unit time. The light intensity of the fundamental wave 50 is maximized at the focus position of the fundamental wave 50 in the nonlinear crystal 11. Accordingly, whether or not the nonlinear crystal 11 breaks down by the UVIGA is thought to be defined by a function of the light intensity of the fundamental wave 50 at the focus position and the speed of the fundamental wave 50 being displaced at that time. In other words, if the light intensity is low, the breakdown of the nonlinear crystal 11 by the UVIGA does not occur even if the speed of the fundamental wave 50 is slow. However, if the light intensity is high, the breakdown of the nonlinear crystal 11 by the UVIGA occurs unless the speed of the fundamental wave 50 is fast. This relationship is given by the following equation:

$$P/V < \alpha \; [J/mm^3] \qquad (1)$$

where P: light intensity [W/mm$^2$] at the focus position of the fundamental wave 50 and V: displacement speed of the fundamental wave 50.

In other words, if the light intensity P at the focus position of the fundamental wave 50 is constant, the breakdown of the nonlinear crystal 11 by the UVIGA can be avoided by setting the speed of the fundamental wave 50 faster than P/α.

The light intensity P at the focus position of the fundamental wave 50 can be calculated by the following equation.

$$P = Q/(\pi(D/2)^2) \qquad (2)$$

where Q: fundamental wave power [W] and D: beam waist diameter [mm].

α is thought to vary depending on the characteristic of the nonlinear crystal 11 and the wavelength of the incident fundamental wave 50. In the nonlinear crystal 11 made of Mg-doped LiNbO$_3$, α=15 [J/mm$^3$].

The operation of the above harmonic generator is described below. The fundamental wave 50 emitted from the laser light source 10 is incident on the scanning mirror 21 undergoing harmonic oscillation. The fundamental wave 50 reflected by the scanning mirror 21 is condensed by the condenser lens 20 and travels in parallel to a direction (second direction) perpendicular to an optical axis depending on the angle of the scanning mirror 21. The shielding element 23 is designed to shield the optical path of the fundamental wave 50 near the rest points of the harmonic oscillation of the scanning mirror 21, i.e. the turning points. Thus, only the fundamental wave 50 constantly being displaced is incident on the nonlinear crystal 11. In the above construction, a local increase of an energy density in the nonlinear crystal 11 can be suppressed by a very simple construction of inserting the shielding element 23. Further, the same effect can be obtained regardless of at which point on the optical path from the scanning mirror 21 to the nonlinear crystal 11 the shielding element 23 is arranged.

Figure 30:
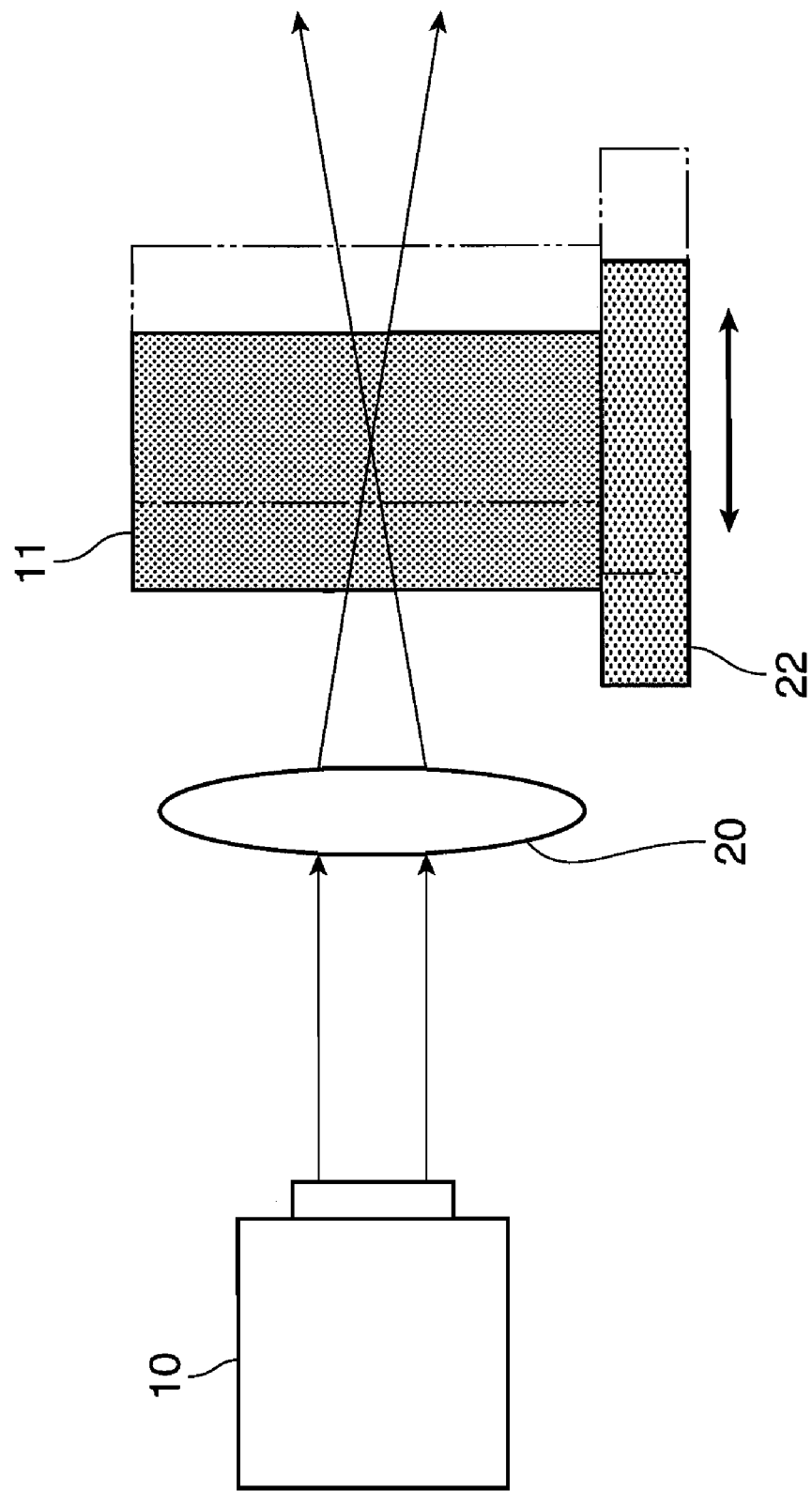
FIG. 30 is a diagram showing a conventional harmonic generator including an oscillating table for oscillating a nonlinear crystal in an optical axis direction.

If the focus position of the fundamental wave 50 relative to the nonlinear crystal 11 is displaced in the direction parallel to the optical axis as shown in FIG. 30, the shielding element 23 constructed to shield the optical path of the fundamental wave 50 in synchronism with the cycle of the turning points of an optical-axis direction oscillator 22 may be, for example, arranged.

If the focus position of the fundamental wave 50 is displaced in the direction (second direction) perpendicular to the optical axis as above, it is preferable to satisfy both of the following conditions (3), (4) if such an adjustment is possible. This is because the deterioration of the efficiency caused by the passage of the fundamental wave 50 outside the poled structure can be maximally prevented and the breakdown by the UVIGA can be remarkably reduced. The amplitude of the fundamental wave is determined based on these conditions, but can be suitably determined depending on the situation. For example, the amplitude can be increased if the laser light source 10 of the fundamental wave 50 has a sufficient power in relation to the output of the second harmonic planned to be obtained by conversion while being decreased if this power is insufficient. A resonance frequency used to displace the fundamental wave 50 is preferably at least 200 [Hz] or higher. If possible, the resonance frequency is more preferably 400 [Hz] or higher.

The fundamental wave 50 oscillates with a point on a bisector of the width of the poled structure as a center (3)

Amplitude of the fundamental wave=width of the poled structure/2+maximum beam diameter in the crystal (4)

PPMgLN doped with 5 mol % of Mg is used as the nonlinear crystal 11. A doped amount of Mg is preferably equal to or higher than 4.9 mol % and equal to or lower than 6 mol %. More preferably, the doped amount of Mg is 5.6±0.2 mol %. With such a doped amount, an optical damage resistance strength is excellent.

Besides, PPMgLN doped with Zn, In or Sc can be similarly used as the nonlinear crystal 11. In order to form the nonlinear crystal 11 having an excellent optical damage resistance strength, it is also possible to use PPMgLN having a stoichiometric composition. In this case, a doped amount of Mg is preferably 1.5 mol % or higher. In addition, Mg-doped LiTaO$_3$, Mg-doped stoichiometric LiTaO$_3$, KTP or the like can also be used as the nonlinear crystal 11.

Second Embodiment

Figure 2:
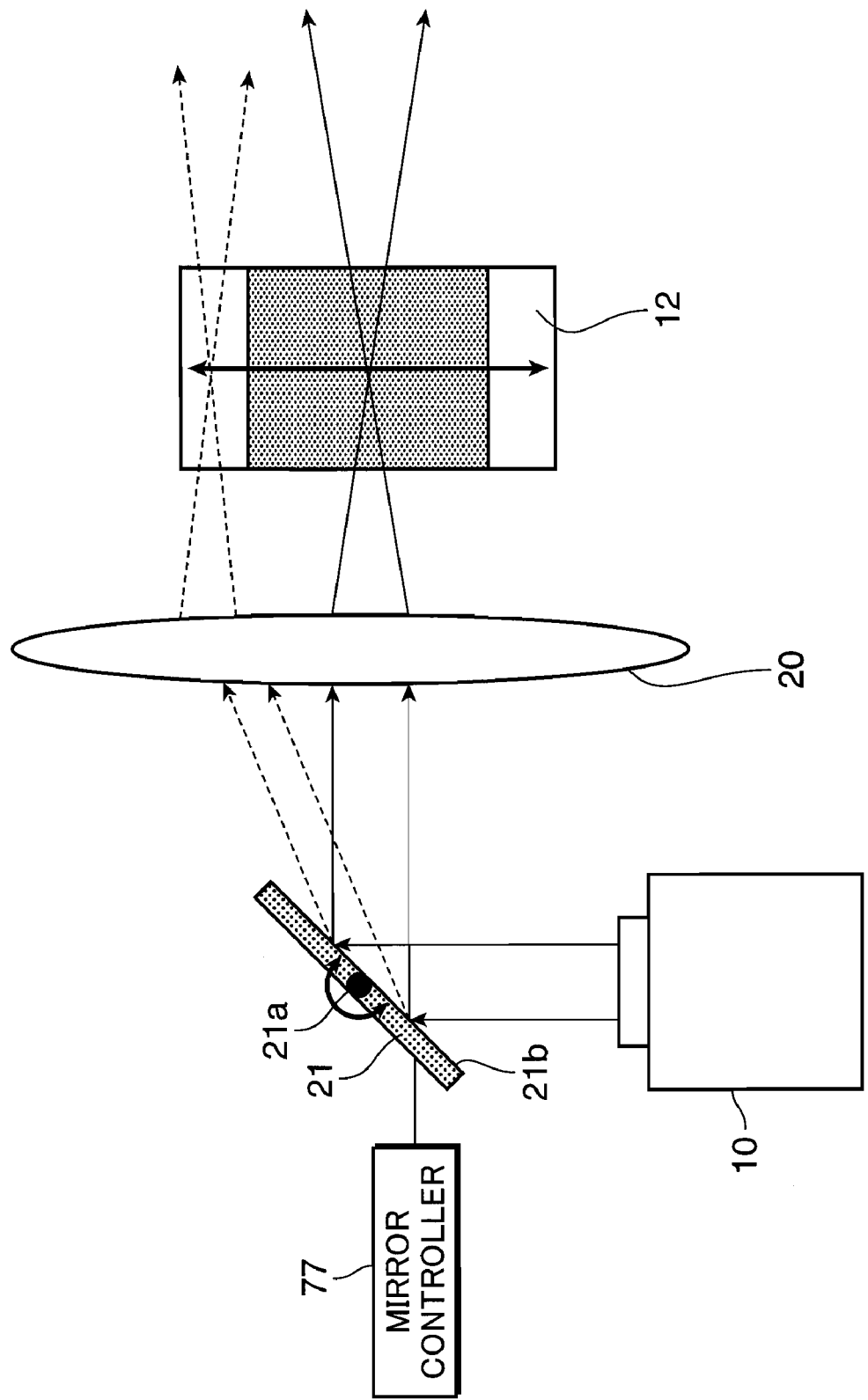
FIG. 2 is a diagram of a harmonic generator according to a second embodiment of the invention constructed such that a laser light is oscillated perpendicularly to an optical axis and has turning points of the oscillation located in ranges where no poled structure is formed.

FIG. 2 shows a second embodiment, which differs from the first embodiment in that the turning points of the displacement of the fundamental wave 50 are set outside the range where the poled structure of a nonlinear crystal 12 is formed.

Specifically, the nonlinear crystal 12 according to the second embodiment includes a formation part 81 where the poled structure is formed and non-formation parts 80 which are provided at the outer sides of the formation part 81 in a width direction (second direction) and where the poled structure is not formed.

In a harmonic generator according to the second embodiment, the formation part 81 is set as an irradiation range of a fundamental wave 50. In other words, the turning points of the oscillation of the fundamental wave 50 are so set in the non-formation parts 80 that the focused position of the fundamental wave 50 constantly moves in the formation part 81. Specifically, the amplitude of the fundamental wave 50 is adjusted by adjusting a distance between a scanning mirror 21 and a condenser lens 20.

A mirror controller 77 according to a second embodiment controls the speed of the scanning mirror 21 such that a displacement speed of the focus position of the fundamental wave 50 in the formation part 81 is such as to be able to avoid the generation of the UVIGA. A method for determining the speed by the mirror controller 77 is described below.

First, a light intensity P at the focus position of the fundamental wave 50 is obtained by the above equation (2).

Subsequently, a speed V for displacing the focus position of the fundamental wave 50 is calculated. First, since the scanning mirror 21 undergoes harmonic oscillation, a displacement U of the focus position of the laser light becomes a harmonic oscillation expressed by the following equation.

$$U = A \sin 2\pi Ft \quad (5)$$

where A: varying amplitude [mm] of the fundamental wave, F: varying frequency [Hz] of the fundamental wave and t: time.

By differentiating the displacement U with respect to time t, the speed V at which the focus position of the fundamental wave 50 is displaced can be obtained as follows.

$$V = 2\pi FA \cos 2\pi Ft \quad (6)$$

Figure 3:
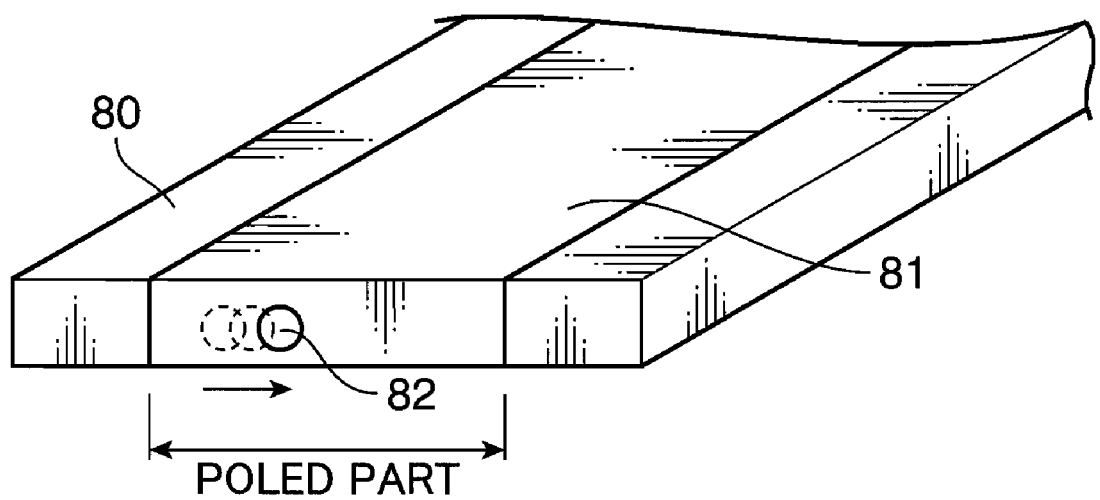
FIG. 3 is a diagram showing a range where the poled structure is formed.

Here in this embodiment, since the fundamental wave 50 undergoes harmonic oscillation at a point on the bisector of the formation part 81 in the width direction, the length L [mm] that is half the width of the formation part 81 of the nonlinear crystal 12 and the amplitude A of the fundamental wave 50 need to have a relationship of A>L in order to prevent the fundamental wave 50 from stopping in the formation part 81 (see FIG. 3).

In other words, the speed of the focus position of the fundamental wave 50 is minimized at the turning points, i.e. at the points A, of the harmonic oscillation in the nonlinear crystal 12, and the amplitude A needs to be larger than L in order to set these points outside the formation parts 81 (in the non-formation parts 80).

Then, t at which U=L is obtained from the equation (5), and the speed V is obtained as a function of the frequency F at the obtained t using the equation (6). The frequency F at which the thus obtained relationship of P and V satisfies the equation (1), i.e. P/V>α is calculated and the speed V is calculated using the equation (6). By displacing the focus position of the fundamental wave 50 at a speed equal to or faster than the thus calculated speed V, the breakdown of the nonlinear crystal 12 by the UVIGA can be avoided.

Figure 25:
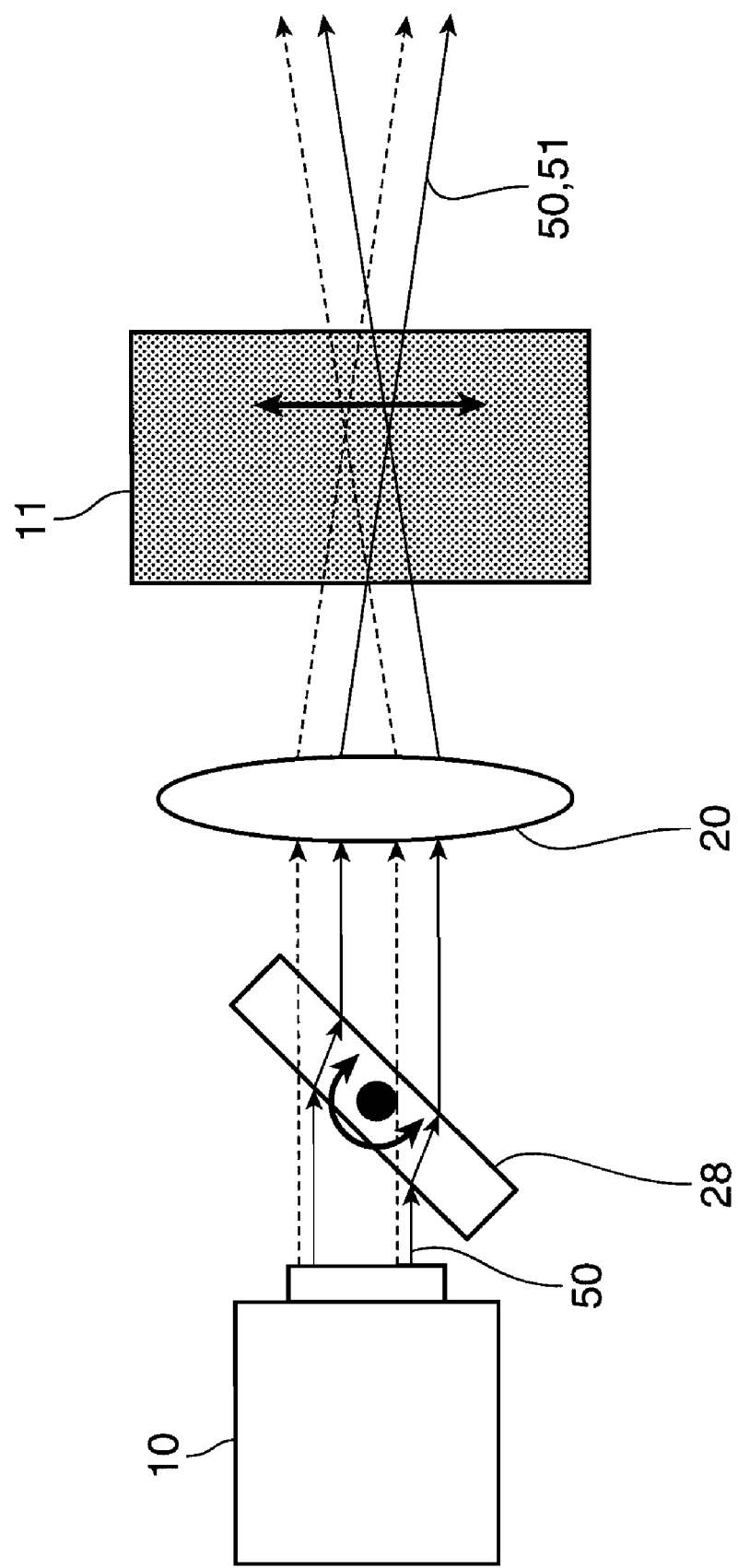
FIG. 25 is a diagram showing still another conventional harmonic generator, in which a laser light is oscillated by a rotating prism.
Figure 26:
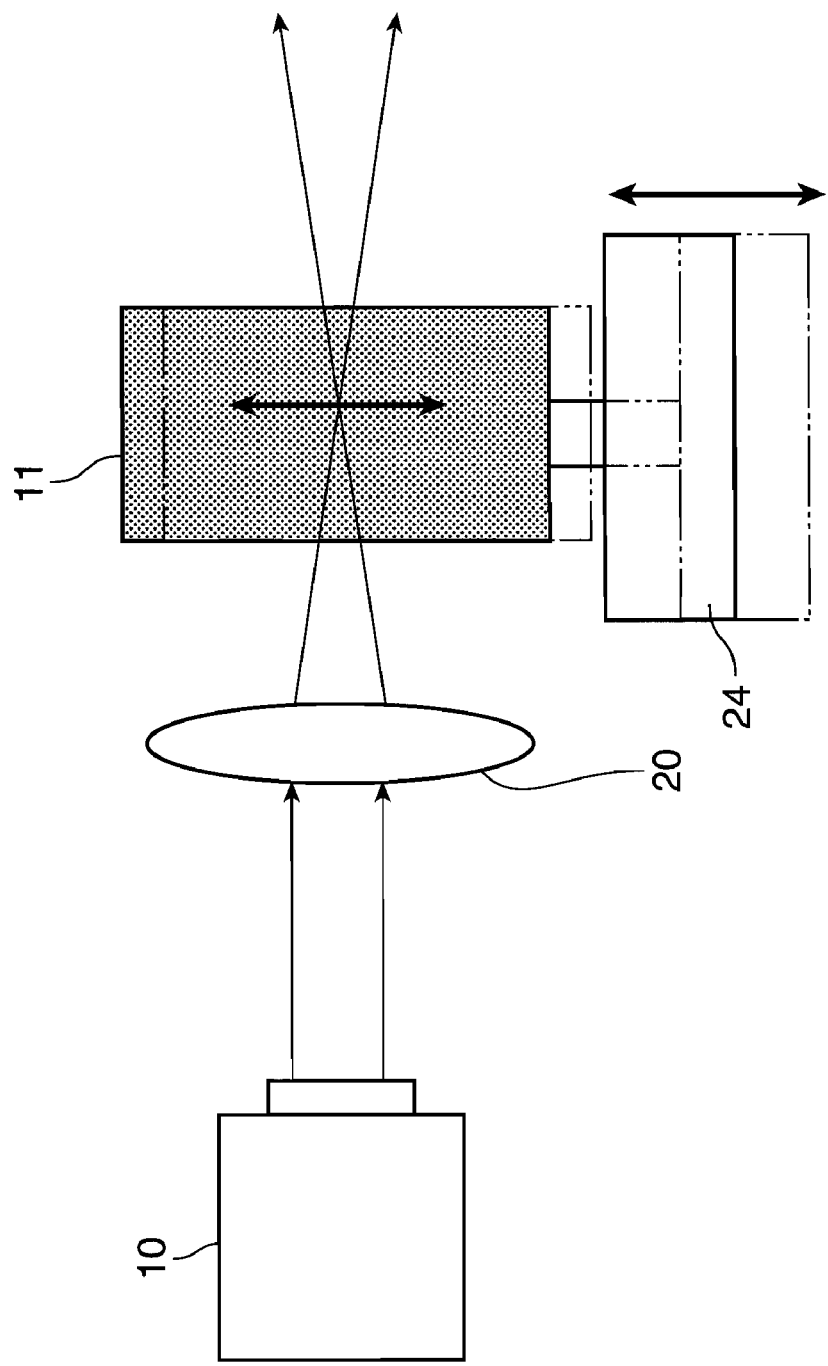
FIG. 26 is a diagram showing further another conventional harmonic generator, in which a nonlinear crystal is oscillated perpendicularly to an optical axis by an oscillating table.

The operation of the harmonic generator according to the second embodiment is described below with reference to FIGS. 2 and 3. The focus position of the fundamental wave 50 condensed by the condenser lens 20 is incident on the nonlinear crystal 12 comprised of the poled-structure formation part 81 and the poled-structure non-formation parts 80 where no poled structure is formed. At this time, the displacement of the laser light is larger than the width of the poled-structure formation part 81 of the nonlinear crystal 12, and the scanning mirror 21 is driven such that the fundamental wave 50 does not stop in the formation part 81. Specifically, in this embodiment, the oscillation range of the scanning mirror 21 is set larger than the width of the formation part 81. Thus, a local increase of an energy density in the nonlinear crystal 12 can be suppressed by a simple construction without necessitating any special ingenuity in the optical system. The local increase of the energy density in the nonlinear crystal can be suppressed by a method similar to the one of the second embodiment also in the construction for driving the prism 28 as shown in FIG. 25 and the construction for moving the nonlinear crystal 11 as shown in FIG. 26.

Third Embodiment

Figure 4:
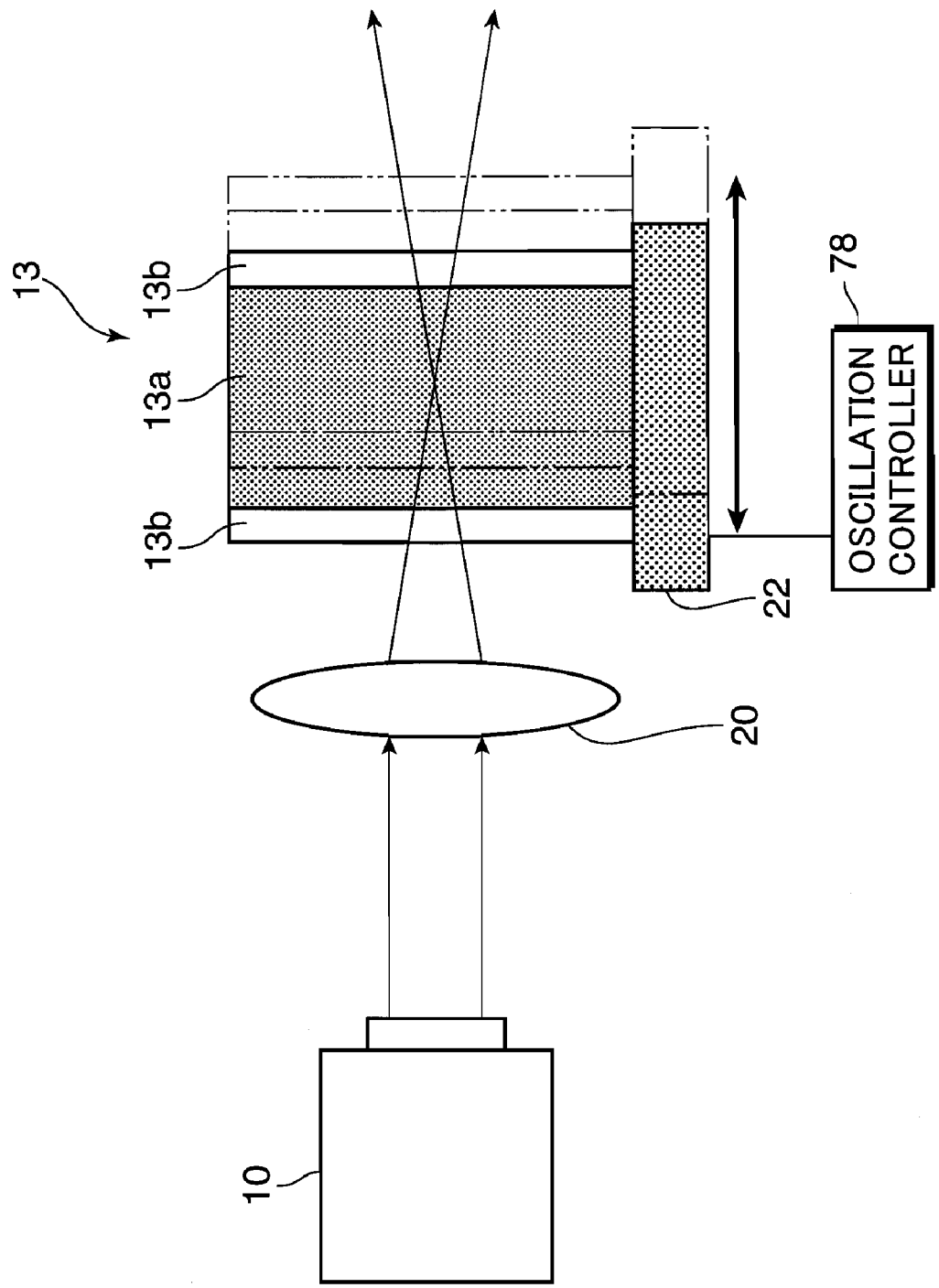
FIG. 4 is a diagram of a harmonic generator according to a third embodiment of the invention constructed such that a nonlinear crystal is oscillated in an optical axis direction of a laser light to have an amplitude larger than a range where a poled structure is formed.

FIG. 4 shows a third embodiment, which differs from the above respective embodiments in that the focus position of the fundamental wave 50 is displaced relative to a nonlinear crystal 13 by moving the nonlinear crystal 13.

The nonlinear crystal 13 according to the third embodiment includes a formation part 13a where a poled structure is formed and non-formation parts 13b where no poled structure is formed. The non-formation parts 13b are arranged at the opposite sides of the formation part 13a in the length direction (first direction: see FIG. 27).

A displacing member according to the third embodiment includes an optical-axis direction oscillator 22 capable of moving the nonlinear crystal 13 placed thereon in a direction parallel to the optical axis of the fundamental wave 50 and a controller 78 for controlling the driving of the optical-axis direction oscillator 22.

The optical-axis direction oscillator 22 moves the nonlinear crystal 13 such that the focus position of the fundamental wave 50 oscillates between the poled-structure non-formation parts 13b. Specifically, the oscillation range of the focus position of the fundamental wave 50 relative to the nonlinear crystal 13 is larger than a dimension of the poled-structure formation part 13a in the length direction (first direction). Thus, the focus position of the fundamental wave 50 is relatively displaced in the nonlinear crystal 13 without stopping in the formation part 13a of the poled structure.

The controller 78 controls a moving speed of the optical-axis direction oscillator 22 (nonlinear crystal 13) by a method similar to those of the first and second embodiments.

Since the emergent position and emerging direction of the fundamental wave 50 from the nonlinear crystal 13 do not change in this construction, a harmonic having a constant optical path and a constant beam diameter can be obtained.

Figure 5:
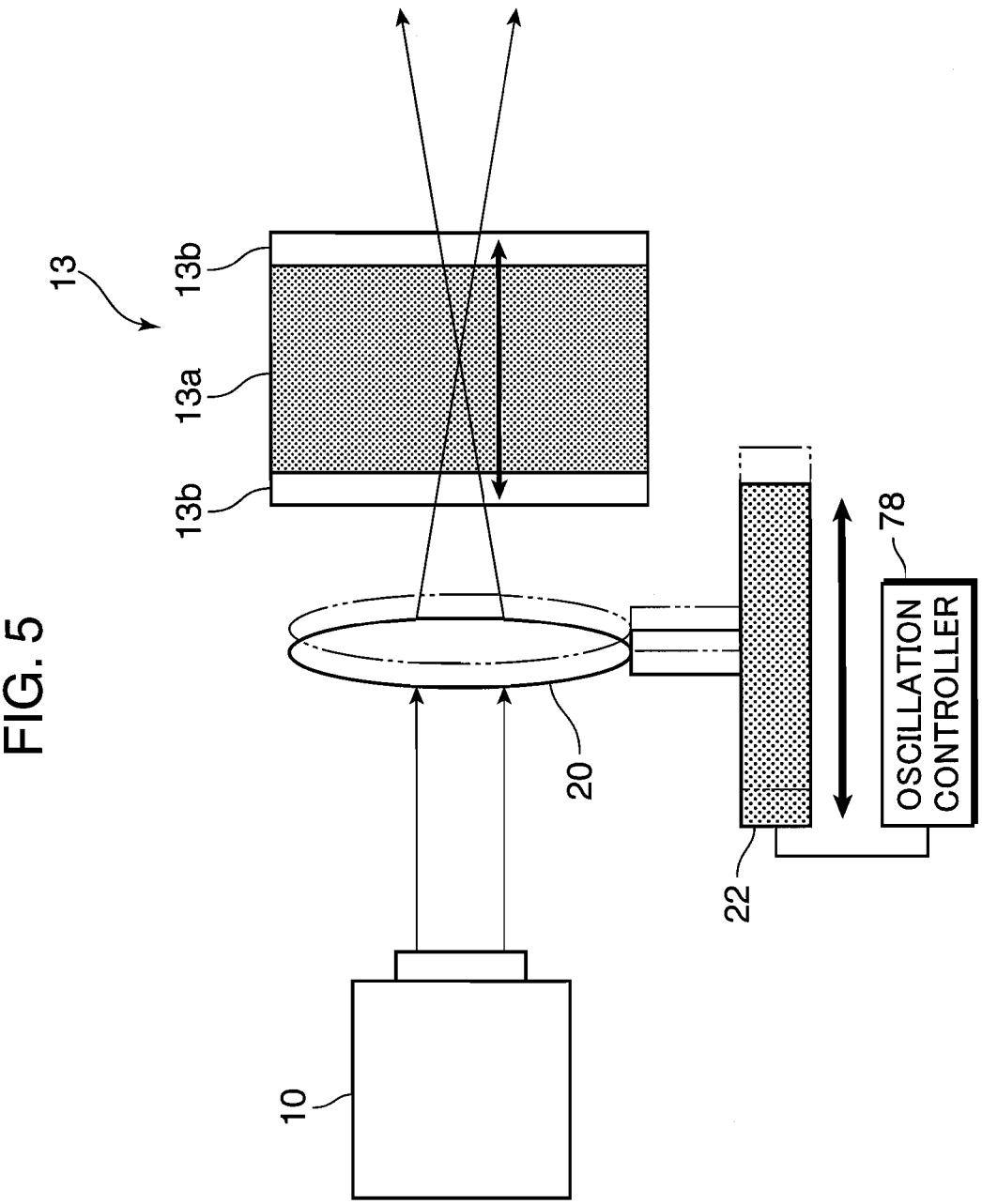
FIG. 5 is a diagram of the harmonic generator according to the third embodiment of the invention constructed such that a condenser lens is oscillated in a direction parallel to the optical axis direction of the laser light to have an amplitude larger than the range where the poled structure is formed.

Although the construction for displacing the nonlinear crystal 13 is described, the same effects can be obtained with a construction for displacing the condenser lens 20 in a direction parallel to the optical axis as shown in FIG. 5.

Fourth Embodiment

Figure 6:
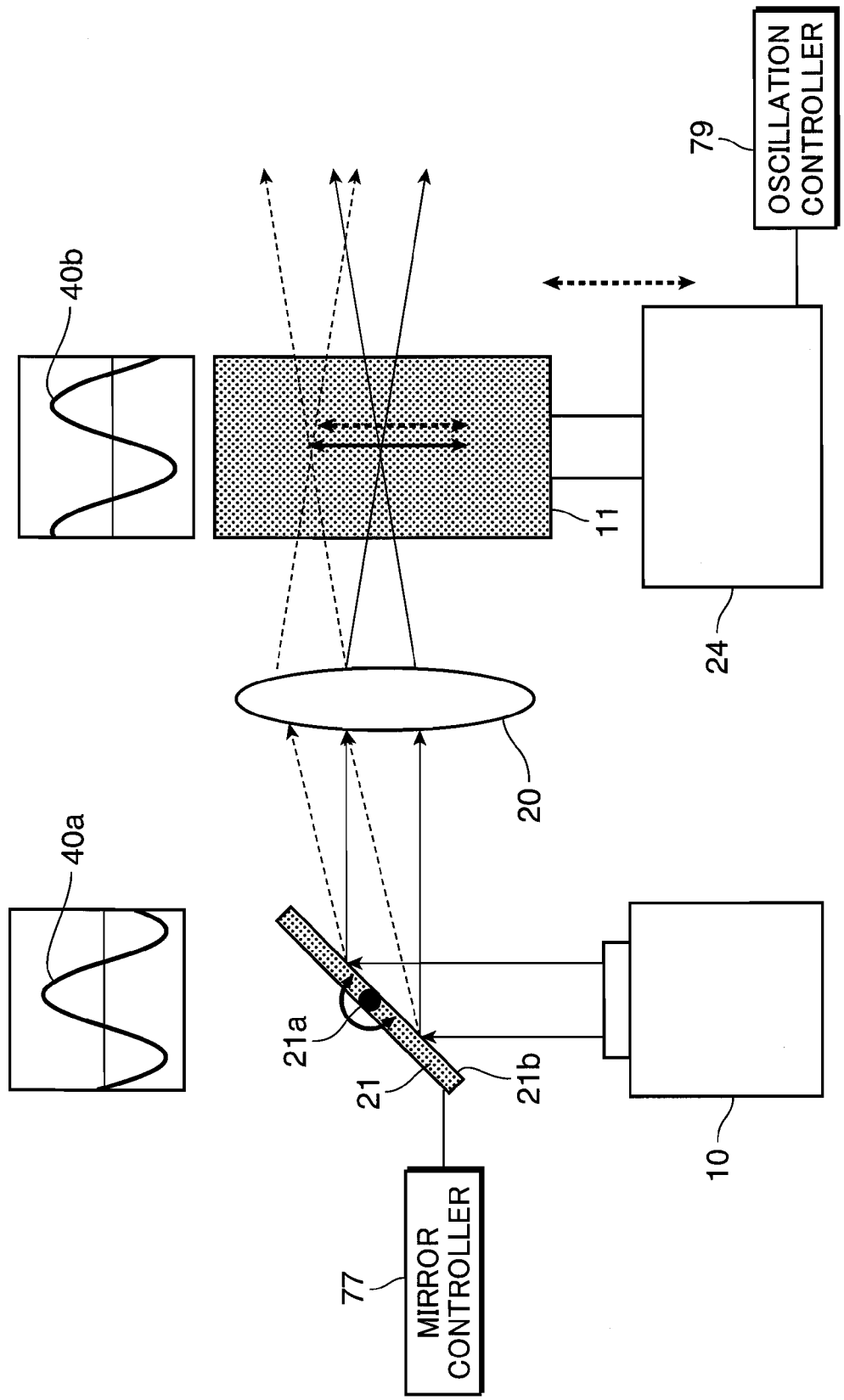
FIG. 6 is a diagram of a harmonic generator according to a fourth embodiment of the invention including two oscillation systems adapted to displace a nonlinear crystal and an optical path of a laser light and having different phases.

FIG. 6 shows a fourth embodiment, which differs from the above respective embodiments in including two driving systems, i.e. e scanning mirror 21 and a vertical direction oscillator 24.

Specifically, a displacing member according to this embodiment includes the scanning mirror 21, the mirror controller 77, the vertical direction oscillator 24 for moving a nonlinear crystal 11 in a direction (width direction of the nonlinear crystal 11: FIG. 27) perpendicular to the optical axis of a fundamental wave 50, and a drive controller 79 for controlling the vertical direction oscillator 24.

The scanning mirror 21 moves the focus position of the fundamental wave 50 in the width direction of the nonlinear crystal 11. The vertical direction oscillator 24 moves the nonlinear crystal 11 in the width direction. Although the scanning mirror 21 and the vertical direction oscillator 24 respectively displace the focus position of the fundamental wave 50 and the nonlinear crystal 11 in the same direction, the phases of their oscillations are shifted. If the cycles are same, an optimal condition is that the phases are shifted by ¼ as shown by 40a, 40b. By doing so, even upon arriving at the rest point of the displacement in either one of the oscillation systems, the other oscillation system is displacing, whereby the nonlinear crystal 11 and the fundamental wave 50 are constantly relatively displaced.

On the other hand, there are cases where the scanning mirror 21 having a relative small mass is oscillated at a high frequency and the nonlinear crystal 11 having a relatively large mass is oscillated at a low frequency. Even if these two frequencies largely differ, a construction can be realized which has no rest point of the laser light and has a smaller power loss of the fundamental wave 50 by selecting suitable phases. FIG. 6 shows an example of the fourth embodiment. Similar effects can be obtained even in a construction having two oscillation systems oscillating in a direction (first direction: see FIG. 27) parallel to the optical axis.

Fifth Embodiment

Figure 7:
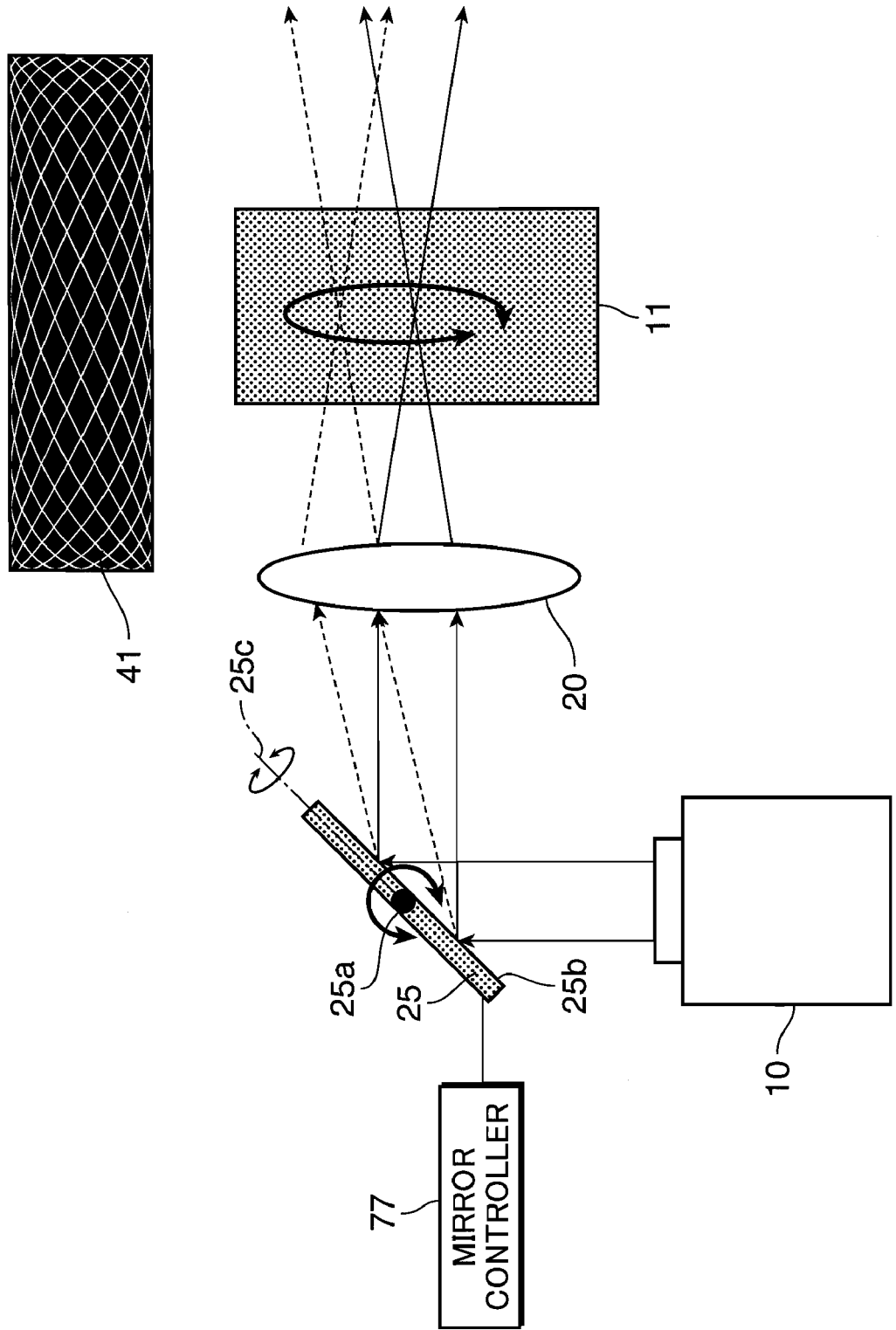
FIG. 7 is a diagram of a harmonic generator according to a fifth embodiment of the invention including two oscillation systems having different axes of oscillation so that an incident point of a laser light on a nonlinear crystal describes Lissajous curves.

FIG. 7 shows a fifth embodiment, which differs from the above respective embodiments in including a scanning mirror 25 for displacing the focus position of a fundamental wave 50 in such a manner as to describe Lissajous curves 41.

A displacing member according to this embodiment includes the scanning mirror 25 and a mirror controller 77 for controlling this scanning mirror 25.

The scanning mirror 25 causes the fundamental wave 50 to harmonically oscillate with respect to a first axis 25a and a second axis 25c by swinging a reflecting surface 25b thereof about the first and second axes 25a, 25c intersecting with each other. As a result, a locus of a laser light reflected by the scanning mirror 25 describes the Lissajous curves 41. The respective axes 25a, 25c are preferably orthogonal to each other. Particularly, one of the axes 25a, 25c is preferably arranged in parallel to the depth direction (third direction) of the nonlinear crystal 11.

The width of the oscillation of the scanning mirror 25 is set such that the laser light is incident within an area formed with a poled structure when the nonlinear crystal 11 is viewed in a direction parallel to the optical axis of the fundamental wave 50. Specifically, the amplitude corresponding to the axis 25a and that corresponding to the axis 25c need to be adjusted in order to set the width of the oscillation by the scanning mirror 25. By adjusting the frequencies of the oscillations about the respective axes 25a, 25c, how the Lissajous curves are described can be controlled and the amplitude in the depth direction (third direction) of the poled structure can be suitably reduced.

Since a local increase of a power density in the nonlinear crystal 11 can be avoided in this embodiment as well, a harmonic can be obtained while a power loss of the fundamental wave 50 is decreased. Similar effects can be obtained also in a construction with an element or an oscillation table including two or more systems that oscillate in different directions instead of the scanning mirror 25.

Sixth Embodiment

Figure 8:
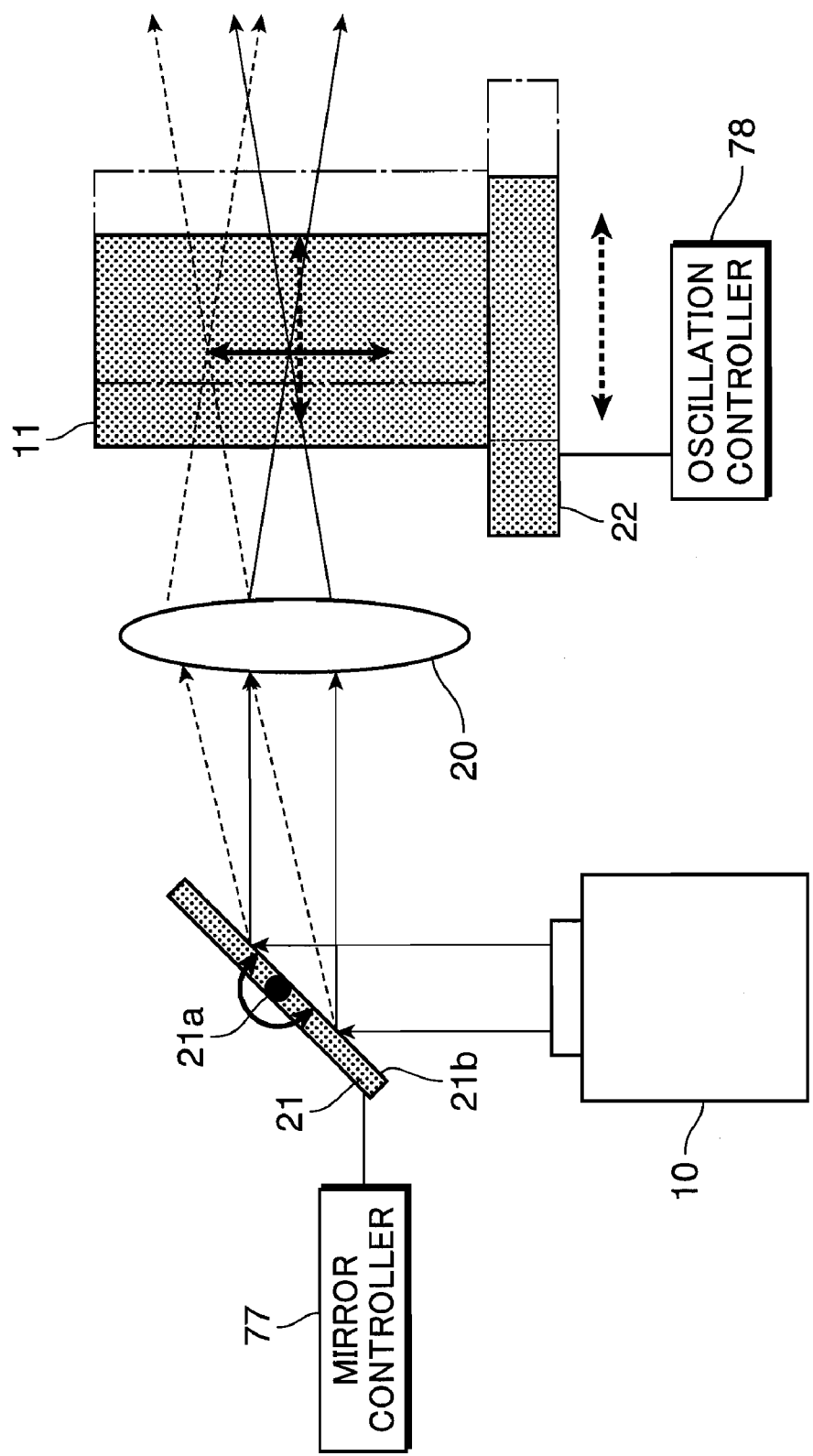
FIG. 8 is a diagram of a harmonic generator according to a sixth embodiment of the invention including an oscillation system for oscillating in an optical axis direction of a laser light and another oscillation system for oscillating in a direction orthogonal to the optical axis direction of the laser light.

FIG. 8 shows a sixth embodiment, which differs from the above respective embodiments in that the scanning mirror 21 and the optical-axis direction oscillator 22 are combined.

Specifically, a displacing member according to this embodiment includes the scanning mirror 21, the mirror controller 77, the optical-axis direction oscillator 22 and the drive controller 78.

The focus position of the fundamental wave 50 is oscillated in a direction (width direction of the nonlinear crystal 11: second direction) perpendicular to the optical axis and a direction (length direction of the nonlinear crystal 11: first direction) parallel to the optical axis by the scanning mirror 21 and the optical-axis direction oscillator 22. Here, the phase of an oscillation system by the scanning mirror 21 and that of an oscillation system by the optical-axis direction oscillator 22 are preferably shifted. Specifically, the phases of the two oscillation systems can be shifted so that, when a movement of the focus position of the fundamental wave 50 by one oscillation system stops, the fundamental wave 50 is being moved by the other oscillation system. Further, the focus position of the fundamental wave 50 is preferably located at such a position, where the conversion efficiency of the harmonic is low, by the oscillation in the direction parallel to the optical axis near the points where the oscillation in the direction perpendicular to the optical axis stops. Since a local increase of a power density in the nonlinear crystal 11 can be avoided in this embodiment as well, a harmonic can be obtained while a power loss of the fundamental wave 50 is decreased.

Seventh Embodiment

Figure 9:
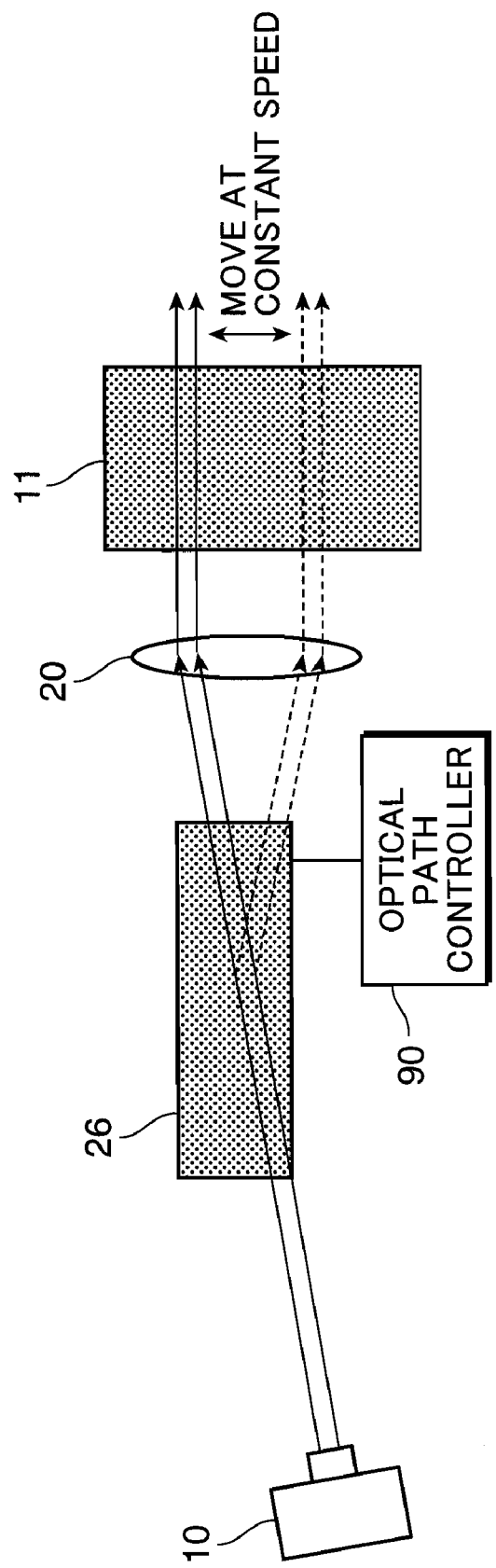
FIG. 9 is a diagram of a harmonic generator according to a seventh embodiment of the invention including an acousto-optical element or an electro-optical element for displaying an optical path of a laser light.

FIG. 9 shows a seventh embodiment, which differs from the above respective embodiments in that the focus position of a fundamental wave 50 is oscillated using an optical element 26 capable of changing a diffraction angle upon receiving a control single.

A displacing member according to the seventh embodiment includes the optical element 26 for diffracting the fundamental wave 50 and an optical path controller 90 for outputting a control signal to this optical element 26.

The optical element 26 is, for example, an acousto-optical element or an electro-optical element. The acousto-optical element is for changing a diffraction angle upon generating an interference pattern corresponding to the frequency of a received ultrasonic wave. Similarly, the electro-optical element is for changing a diffraction angle upon receiving an electrical signal.

Figure 10:
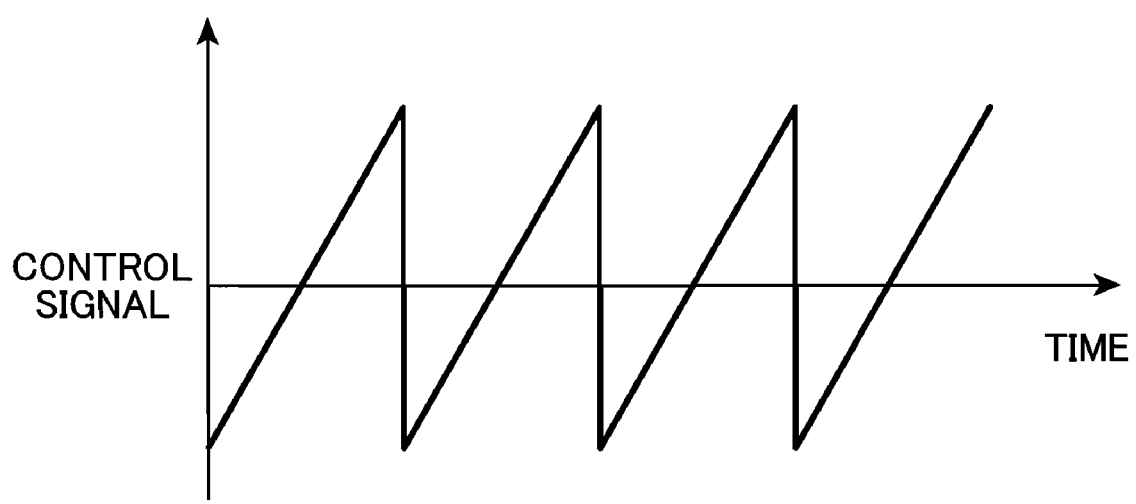
FIG. 10 is a chart showing the waveform of a control signal to be inputted to the acousto-optical element or electro-optical element of FIG. 9.

The optical path controller 90 gives an ultrasonic wave, an electrical signal or the like to the optical element 26 to change the optical path of the fundamental wave 50 in a preset pattern. Specifically, by outputting such a serrated control signal as shown in FIG. 10 to the optical element 26, the optical path controller 90 can keep displacing the focus position of the fundamental wave 50 without stopping in the nonlinear crystal 11. In other words, if the control signal is outputted in the pattern of FIG. 10, the focus position of the fundamental wave 50 starts moving from a specific start position and returns to the start position the moment it reaches a specific end position.

The optical path controller 90 can control the speed of the focus position of the fundamental wave 50 as in the first embodiment.

Eighth Embodiment

Figure 11:
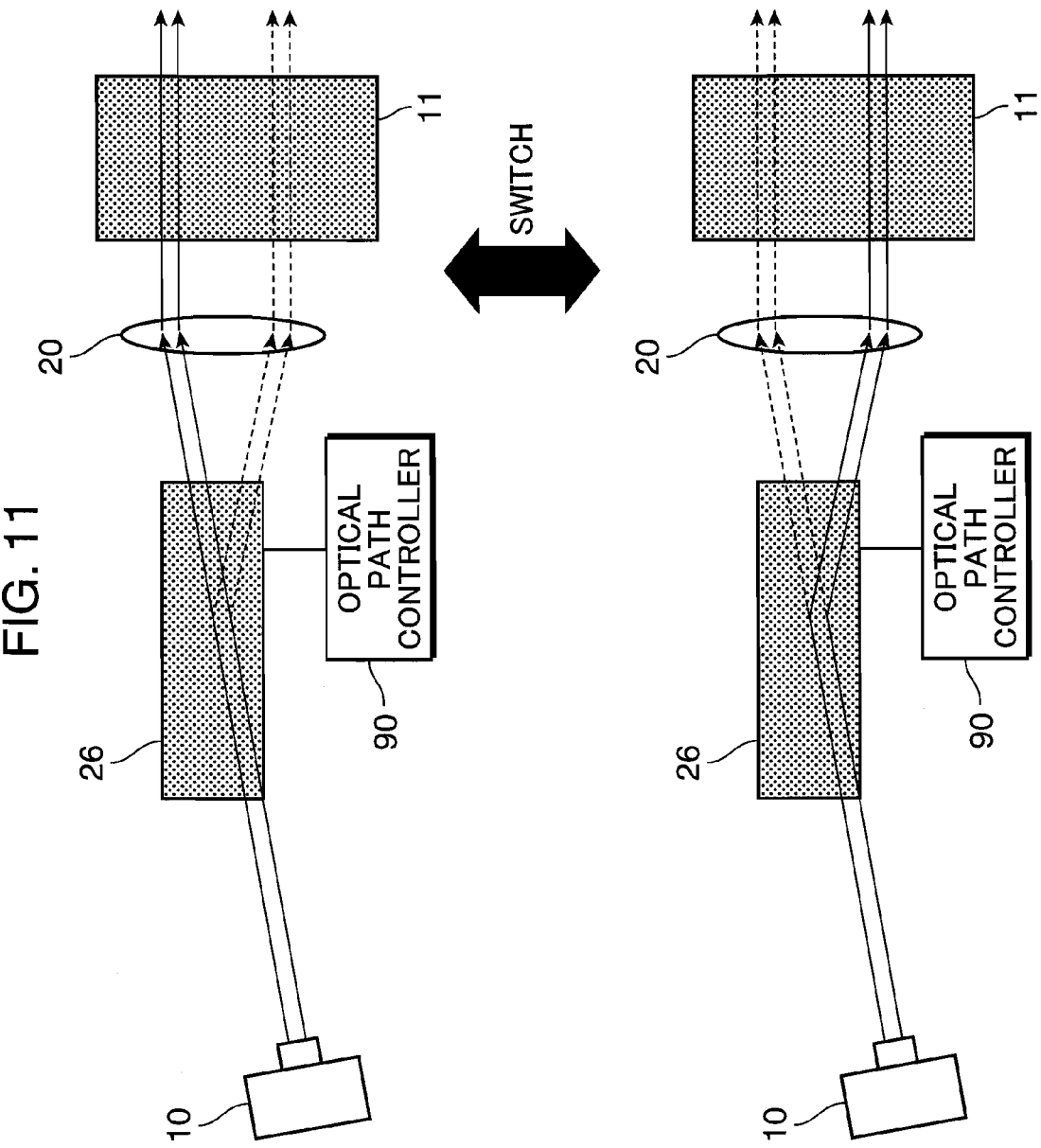
FIG. 11 is a diagram of a harmonic generator according to an eighth embodiment of the invention constructed to switch an optical path of a laser light using the acousto-optical element or electro-optical element of FIG. 9.

FIG. 11 shows an eighth embodiment, which differs from the above respective embodiments in that the optical path of the fundamental wave 50 is switched so that the focus position of the fundamental wave 50 is switched between two specific points. Since the construction of a displacing member is similar to that of the seventh embodiment, it is not described.

Figure 12:
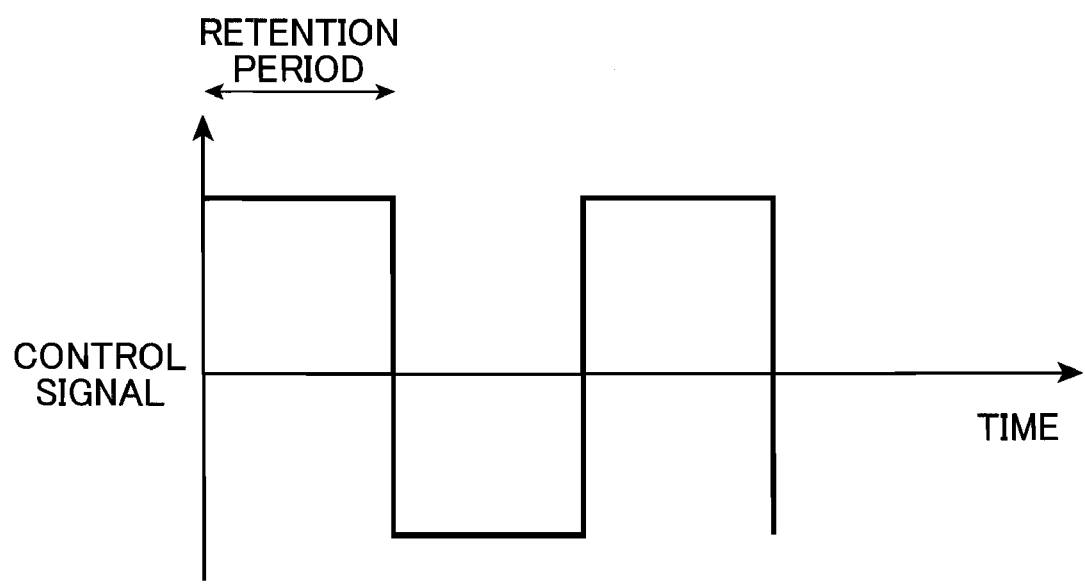
FIG. 12 is a chart showing the waveform of a control signal to be inputted to the acousto-optical element or electro-optical element of FIG. 11.

An optical path controller 90 according to the eighth embodiment outputs a pulse signal as shown in FIG. 12. Thus, the optical path of the fundamental wave 50 is switched between the optical path shown by solid line in an upper part of FIG. 11 and the one shown by solid line in a lower part of FIG. 11.

In this embodiment, the focus position of the fundamental wave 50 stops for a predetermined time on the two switchable paths. In order to suppress the breakdown of the nonlinear crystal 11 by the UVIGA, the time during which the fundamental wave 50 stops in the nonlinear crystal 11 (output period of the pulse signal of FIG. 12) needs to be 5 ms or shorter when the power density of the fundamental wave 50 is 2500 W/mm$^2$.

According to this embodiment, second harmonics can be obtained while the power loss of the fundamental wave 50 is reduced since a local increase of an energy density in the nonlinear crystal 11 can be avoided by switching the optical path of the fundamental wave 50. Particularly, since the second harmonics can be emitted from two points of the nonlinear crystal 11, this embodiment is effective in the case where these second harmonics are separately utilized.

Ninth Embodiment

Figure 13:
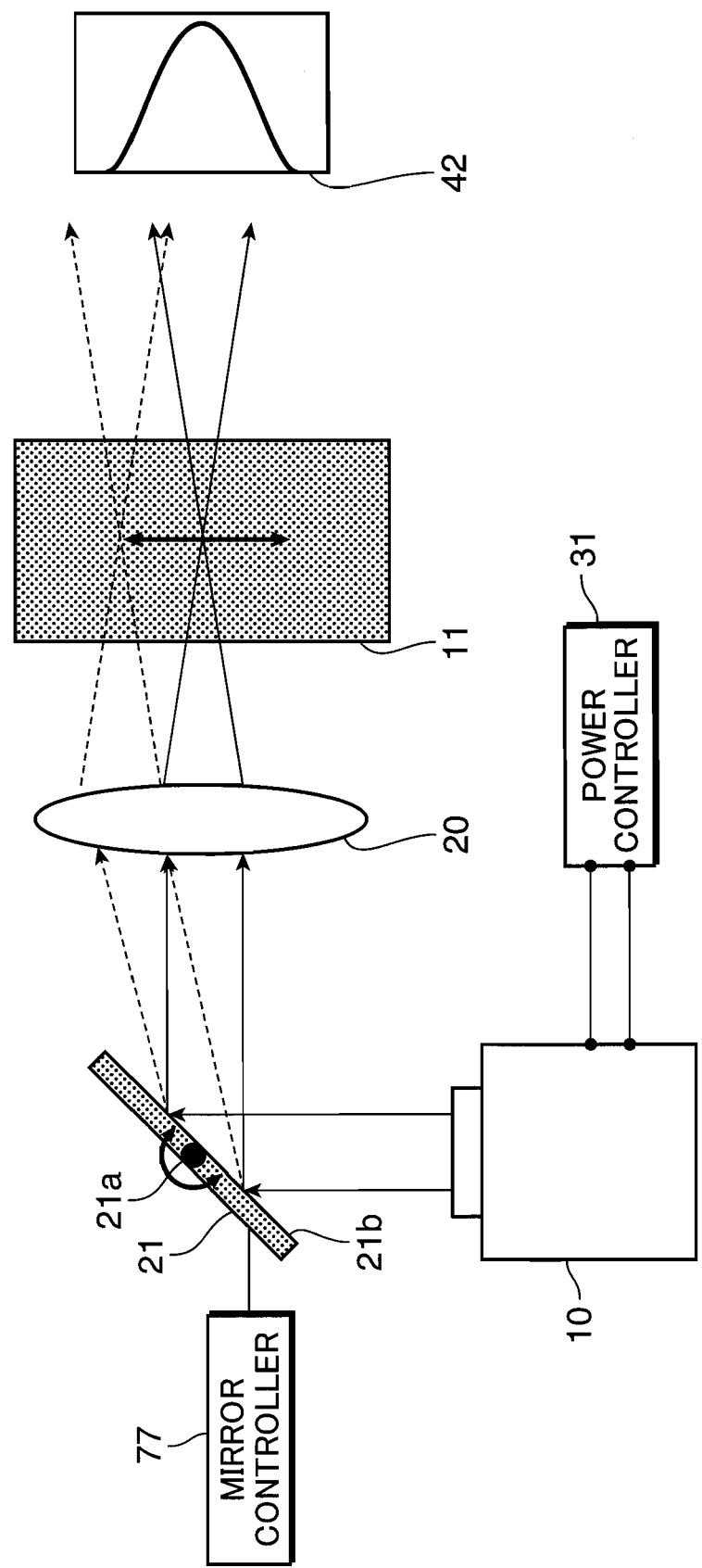
FIG. 13 is a diagram of a harmonic generator according to a ninth embodiment of the invention constructed to control the power of a fundamental wave in accordance with a displacement of a laser light.

FIG. 13 shows a ninth embodiment, which differs from the above respective embodiments in that the power of a fundamental wave 50 is controlled in accordance with the speed of the fundamental wave 50 in the nonlinear crystal 11.

A displacing member according to the ninth embodiment includes the scanning mirror 21, the mirror controller 77 and a power controller 31 for controlling the power of the fundamental wave 50 emitted from the laser light source 10.

The power controller 31 controls the power of the fundamental wave 50 in synchronism with harmonic oscillation by the scanning mirror 21. Specifically, the power controller 31 controls the power of the fundamental wave 50 so that the relationship (P/V>α) defined by the equation (1) described in the first embodiment does not hold.

Since the relationship (P/V>α) defined by the equation (1) described in the first embodiment is likely to be satisfied particularly near the rest points of the scanning mirror 21 undergoing harmonic oscillation, i.e. the points where the speed of the focus position of the fundamental wave 50 becomes 0, a temperature increase caused by the UVIGA is likely to occur. Thus, the power controller 31 controls the power of the fundamental wave 50 so that the relationship defined by the equation (1) does not hold due to the power of the fundamental wave 50 and the speed of the focus position of the fundamental wave 50. It is most preferable to execute the power control such that the product of the power density and speed of the fundamental wave 50 is invariably constant.

According to this embodiment, a second harmonic can be obtained while the loss of the fundamental wave 50 is reduced since a local increase of the power density in the nonlinear crystal 11 can be avoided by controlling the power of the fundamental wave 50. Particularly, in this embodiment, an occurrence of the UVIGA can be suppressed by a simple construction by controlling the power of the fundamental wave while maintaining the optical system.

Tenth Embodiment

Figure 14:
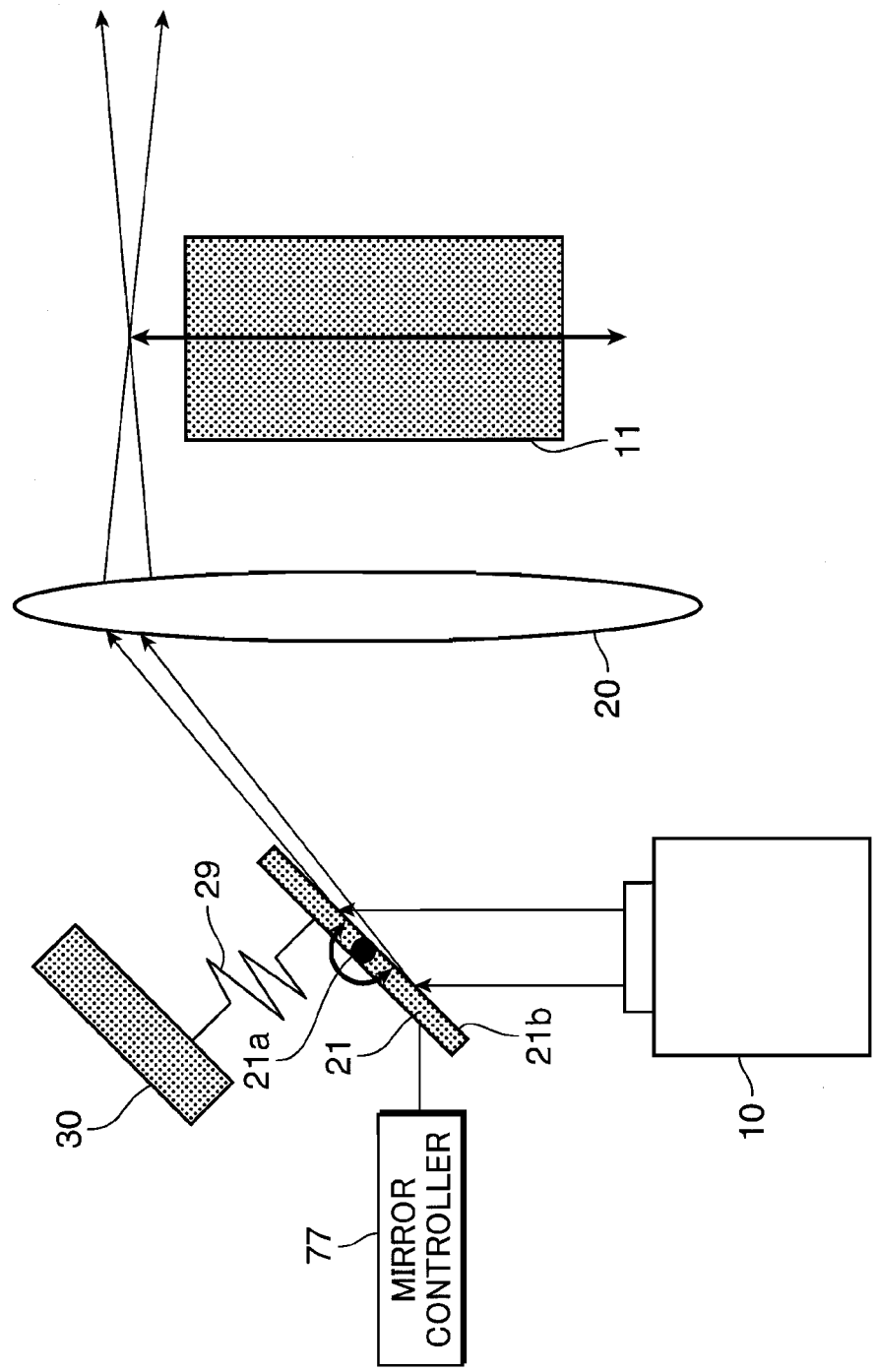
FIG. 14 is a diagram of a harmonic generator according to a tenth embodiment of the invention constructed to constrain the posture of a scanning mirror during the stop.

FIG. 14 shows a tenth embodiment. A harmonic generator according to the tenth embodiment has an additional construction for causing the fundamental wave 50 not to be incident on the nonlinear crystal 11 before the scanning mirror 21 is driven.

In the case where the scanning mirror 21 is resting, the scanning mirror 21 is, for example, pulled to a swing position beyond an original drive range by a spring 29. In this state, the fundamental wave 50 reflected by the reflecting surface 21b of the scanning mirror 21 is introduced to the outside of the nonlinear crystal 11, wherefore there is not likelihood of breaking the nonlinear crystal 11. The safety structure for the nonlinear crystal 11 during the resting time of the scanning mirror 21 can be realized from a hardware side by such a simple construction.

The nonlinear crystal 11 can also be protected by controlling a driving sequence of the scanning mirror 21 and the laser light source 10. In other words, the drive of the laser light source 10 and the scanning mirror 21 can be controlled by always driving the scanning mirror 21 prior to the laser light source 10 in the case of emitting the fundamental wave 50 from the laser light source 10.

The harmonic generators according to the respective embodiments are not limited to those described in the above first to ninth embodiments, and high-output and high-efficiency laser lights can be obtained by a harmonic generator that is a combination of some of the first to ninth embodiments.

Eleventh Embodiment

Figure 15:
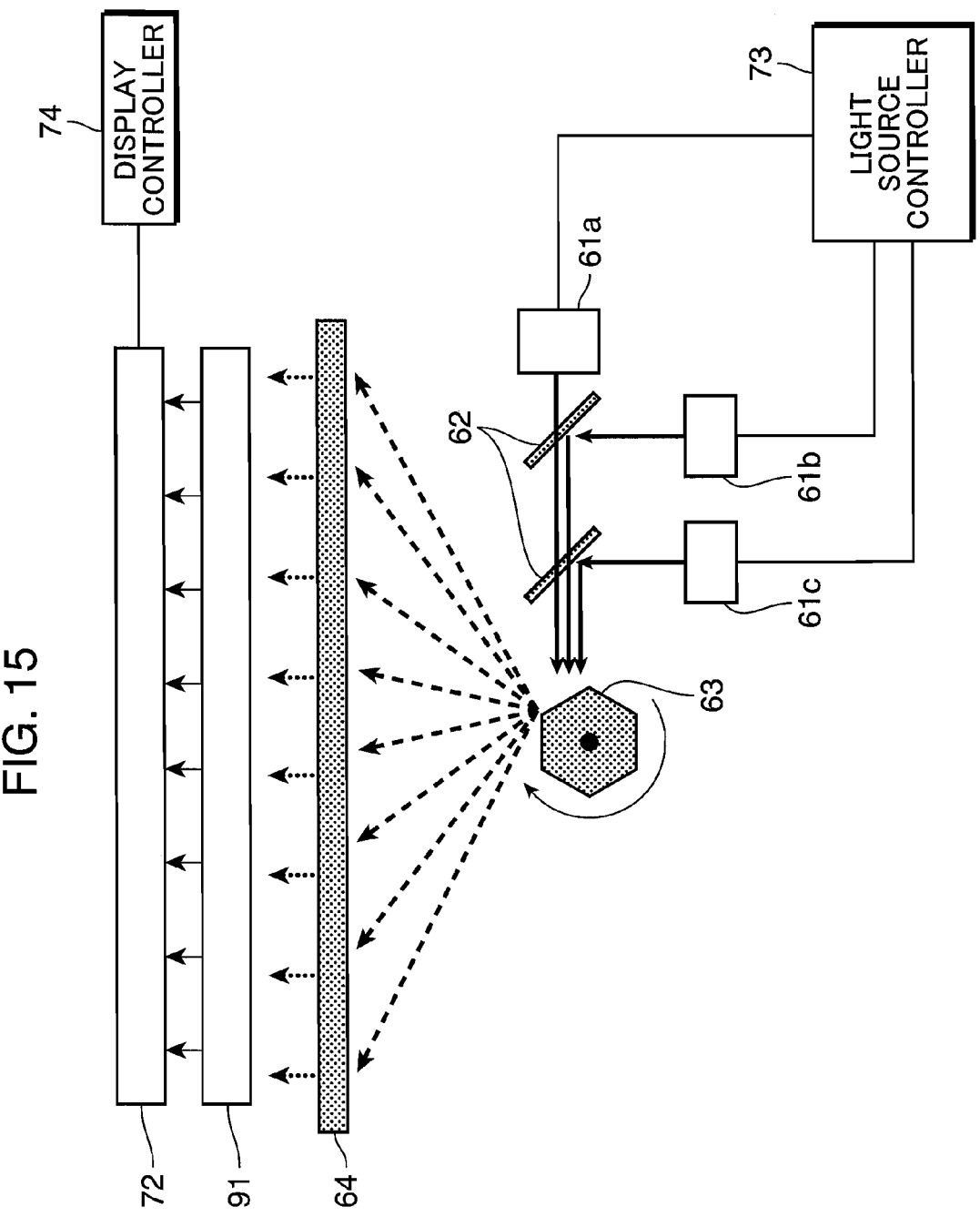
FIG. 15 is a diagram showing an image display device according to an eleventh embodiment of the invention.

FIG. 15 shows one embodiment of an image display device using the above harmonic generator.

The image display device according to an eleventh embodiment includes red, blue and green laser light sources 61a, 61b and 61c, dichroic mirrors 62, a polygonal mirror 63, a Fresnel lens 64, a light guide panel 91, a liquid crystal panel (spatial modulation element) 72, a light source controller 73 and a display controller 74.

In this embodiment, the harmonic generator according to any one of the first to tenth embodiments is adopted as the green laser light source 61c out of the respective laser light sources 61a, 61b and 61c. Here, the harmonic generator as the green laser light source 61c includes the laser light source 10 for emitting the fundamental wave 50 and the nonlinear crystal 11 for generating a second harmonic from the fundamental wave 50. Further, the harmonic generator as the green laser light source 61c includes any one of the displacing members according to the above first to tenth embodiments as a displacing member for displacing the optical path of the fundamental wave 50 and the nonlinear crystal 11, 13.

Figure 16:
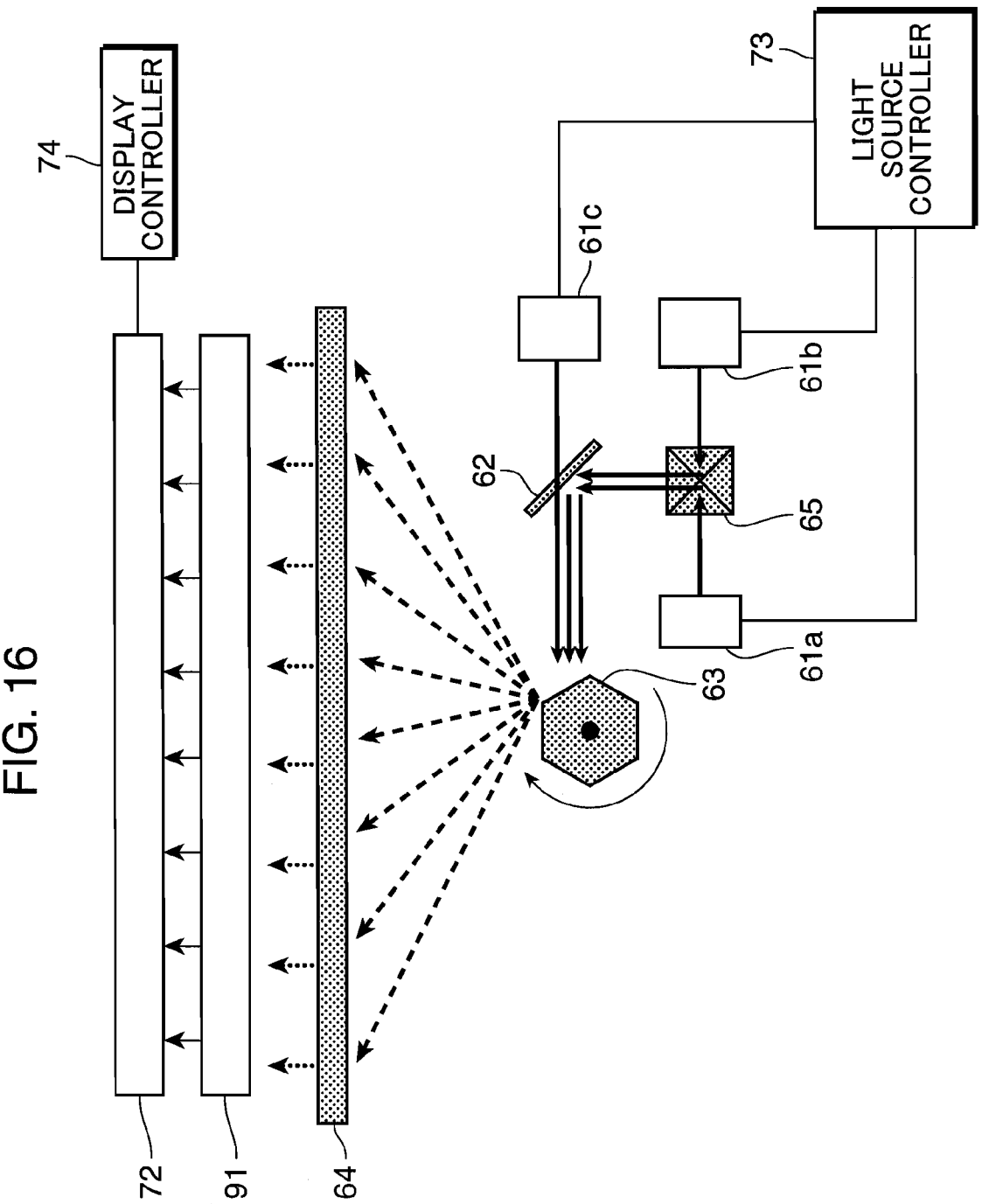
FIG. 16 is a diagram showing a modification of the image display device according to the eleventh embodiment of the invention.

The dichroic mirrors 62 are designed to combine the laser lights of the red, blue and green laser light sources 61, 61b and 61c. The laser lights combined by the dichroic mirrors 62 are incident on the rotating polygonal mirror 63. Here, a cross prism 65 may be used as means for combining the laser lights in place of the dichroic mirror 62. A construction using the cross prism 65 is shown in FIG. 16.

The polygonal mirror 63 is a mirror having a plurality of reflecting surfaces and rotating at a high speed, and scans the laser lights on the Fresnel lens 64 by reflecting the laser lights incident on the reflecting surfaces while rotating. The laser lights reflected by the polygonal mirror 63 are incident on the light guide plate 91 via the Fresnel lens 64. This light guide plate 91 is provided on the rear surface of the liquid crystal panel 72 and used as a backlight for the liquid crystal panel 72.

The liquid crystal panel 72 is constructed to convert the laser lights incident from the light guide plate 91 into an image.

The light source controller 73 controls the powers of the laser lights generated by the respective laser light sources 61*a*, 61*b* and 61*c*.

The display controller 74 controls the image conversion by the liquid crystal panel 72.

If the liquid crystal panel 72 becomes larger in size, the powers of required laser lights increase. In order to make the laser light source 10 smaller, a semiconductor laser including a microchip array can be used. In the case of using the above harmonic generator provided with the laser light source 10 including the microchip array and the displacing member for oscillating the focus position of the fundamental wave 50 in the direction perpendicular to the optical axis, an intensity distribution of the obtained second harmonics is relatively homogenized by displacing the focus position of the fundamental wave 50. This means that uniform harmonics can be obtained by reducing the output differences and the deteriorating influences of the individual semiconductor lasers for outputting the laser light of the fundamental wave 50. Since the use of nonuniform laser light sources in an image display device causes color shading and nonuniform luminance distributions, the harmonic generators according to the first to tenth embodiments are suitable as the laser light sources of the image display device.

A laser light to become the green light source is preferably located at the position of the green laser light source 61*c*. This is because the laser optical path of the green laser light source 61*c* passes through a smaller number of elements than those of the red and blue laser light sources 61*a*, 61*b*. Since the laser light of the green laser light source 61*c* is emitted while being displaced by the displacing member, passage areas of the laser light of the green laser light source 61*c* through the elements are larger than those of the laser lights of the red and blue laser light sources 61*a*, 61*b*. As a result, the laser light of the green laser light source 61*c* is subject to more influences by the elements such as the surface accuracy of the mirror. Therefore, it is advantageous if the green laser light passes through the smallest possible number of elements.

Twelfth Embodiment

Figure 17:
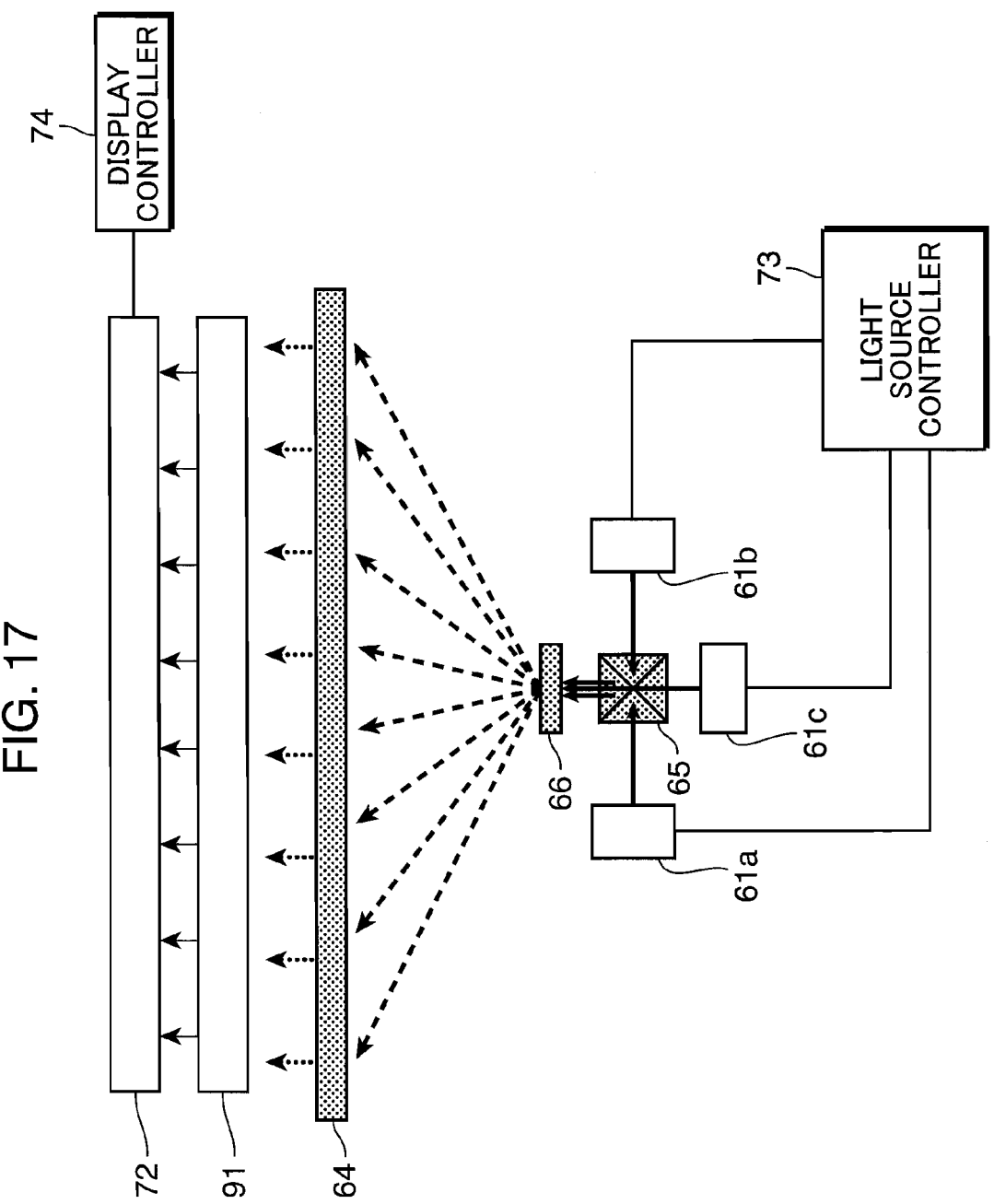
FIG. 17 is a diagram showing an image display device according to a twelfth embodiment of the invention.

FIG. 17 shows an image display device according to a twelfth embodiment. The twelfth embodiment differs from the above embodiment in that a line diffuser element 66 is provided in place of the polygonal mirror 63.

The line diffuser element 66 is designed to allow the passage of the laser lights emitted from red, blue and green laser light sources 61*a*, 61*b* and 61*c* while linearly expanding them. The laser lights having passed through the line diffuser element 66 are incident on a light guide plate 91.

As a method for linearly expanding the laser lights, there are a refracting method by a lens and a diffracting method using a diffractive optical element. A lenticular structure is preferably adopted as a specific construction. It is preferable to cause the combined red, blue and green laser lights to pass through the line diffuser element 66. In the image display device according to this embodiment as well, the laser light sources 61*a*, 61*b* and 61*c* are utilized as backlights for a liquid crystal panel 72.

Here, the green laser light source 61*c* includes a laser light source 10 for emitting a fundamental wave and a nonlinear crystal 11 for generating a second harmonic from the fundamental wave 50. Further, any one of the displacing members according to the above first to tenth embodiments can be used as a displacing member for displacing the laser light.

Particularly, the use of the harmonic generator that oscillates the focus position of the fundamental wave 50 in a direction perpendicular to the optical axis is effective not only in realizing the uniform laser light source, but also in linearly expanding the laser light. The second harmonic obtained by oscillating the fundamental wave 50 perpendicularly to the optical axis becomes a laterally long beam. Since it is easier to linearly expand a laterally long beam than to linearly expand a laser light having a small beam diameter, an optical design is simpler. In the case of using the harmonic generator for controlling the power of the fundamental wave 50, power consumption can be suppressed when the power of the fundamental wave 50 is unnecessary for the image display by the liquid crystal panel 72, wherefore an image display device with low power consumption can be realized.

Out of the above harmonic generators for displacing the focus position of the fundamental wave 50 perpendicularly to the optical axis, the one for describing Lissajous curves is more preferably used in the twelfth embodiment for the following reason. Specifically, the Lissajous curves are denser at the opposite widthwise ends of the nonlinear crystal 11 since the dimension of the nonlinear crystal 11 having the poled structure in the depth direction is extremely smaller than the dimension thereof in the width direction. Accordingly, if the focus position of the fundamental wave 50 is displaced along the Lissajous curves, the energy density becomes relatively large at the opposite widthwise ends of the nonlinear crystal. This means that the intensity distribution of the laterally long beam is convex outward. Since the intensity at the outer side is generally low upon linearly expanding the laser light, there can be obtained a linearly expanded laser light having a more uniform intensity by using the laser light whose intensity distribution is convex outward.

Thirteenth Embodiment

Figure 18:
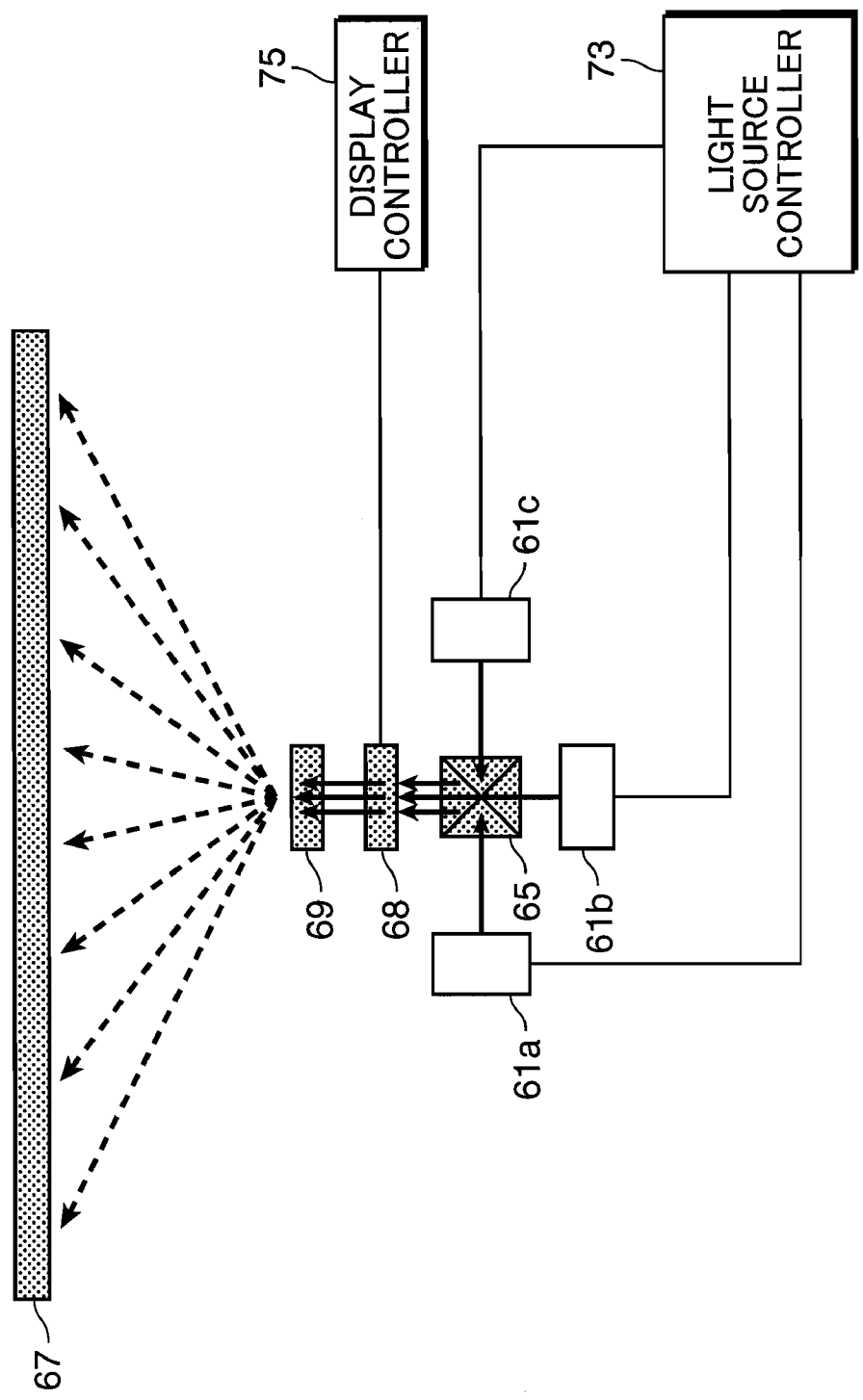
FIG. 18 is a diagram showing a projector or projection image display device according to a thirteenth embodiment of the invention.

FIG. 18 shows an image display device according to a thirteenth embodiment, which differs from the above embodiments in being a projector or a projection-type image display device for projecting an image on a screen 67.

The image display device according to this embodiment includes red, blue and green laser light sources 61*a*, 61*b* and 61*c*, a cross prism 65, a transmissive or reflective liquid crystal panel 68, a projection lens 69, the screen 67, a display controller 75 for controlling the liquid crystal panel 68, and a light source controller 73 for controlling the respective laser light sources 61*a*, 61*b* and 61*c*.

The harmonic generator according to any one of the first to tenth embodiments can be used as the green laser light source 61*c*.

Laser lights emitted from the respective laser light sources 61*a*, 61*b* and 61*c* are incident on the liquid crystal panel 68 to be converted into an image, for example, after being combined by the cross prism 65. The image formed by the liquid crystal panel 68 is displayed on the screen 67 after being expanded by the projection lens 69. In this image display device, the laser lights need to be irradiated onto the entire surface of the liquid crystal panel 68. Thus, the larger the beam diameters of the laser lights to be irradiated to the liquid crystal panel 68, the more advantageous. The harmonic generator that oscillates the focus position of the fundamental wave 50 perpendicularly to the optical axis can be effectively used in this image display device since being capable of obtaining the second harmonic as a laterally long beam.

Fourteenth Embodiment

Figure 19:
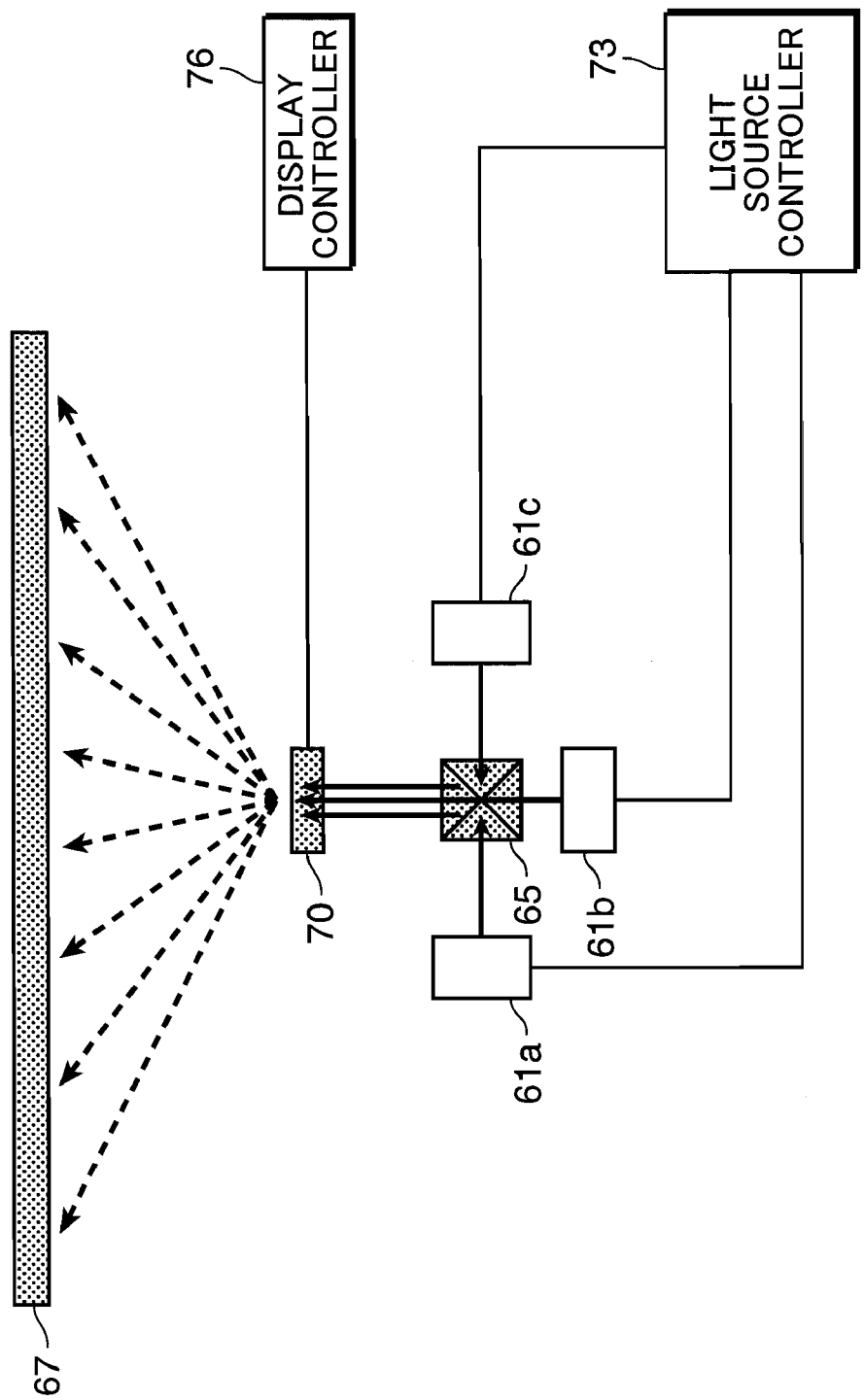
FIG. 19 is a diagram showing a scanning image display device according to a fourteenth embodiment of the invention.

FIG. 19 shows an image display device according to a fourteenth embodiment, which differs from the above embodiments in being a scan-type image display device.

This image display device includes a two-dimensional (2D) scanning mirror 70 for scanning laser lights on a screen 67. The 2D scanning mirror 70 is designed to scan the laser lights on the screen 67 to display an image by being controlled by a display controller 76. A green laser light source 61*a* includes any one of the harmonic generators according to the first to tenth embodiments. Since it is required that the incidence positions of the laser lights on the 2D scanning mirror 70 are accurately determined and that the beam diameters of the laser lights are small, the harmonic generator that oscillates in the direction parallel to the optical axis can be particularly effectively used.

Fifteenth Embodiment

Figure 20:
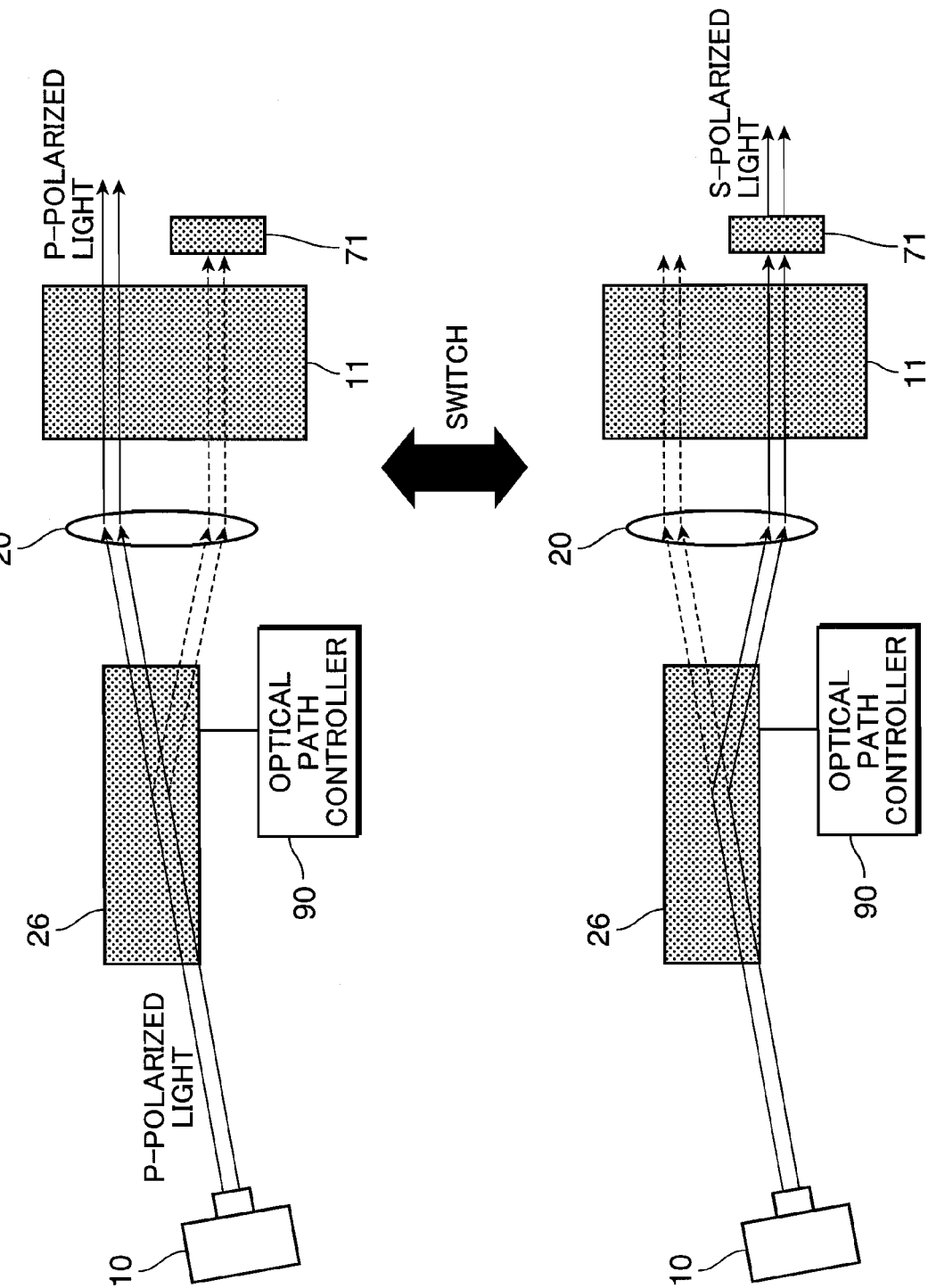
FIG. 20 is a diagram showing a harmonic generator of the type for switching a laser optical path by inserting a half-wave plate in an image display device according to a fifteenth embodiment of the invention.

FIG. 20 shows a three-dimensional (3D) display device as a fifteenth embodiment. The fifteenth embodiment differs from the above embodiments in that laser lights emitted from laser light sources 61*a*, 61*b* and 61*c* are projected on a screen 67 while being divided into P- and S-polarized lights.

The 3D display device according to this embodiment uses laser lights of the red, blue and green laser light sources 61*a*, 61*b* and 61*c* as light sources. The laser lights emitted from these light sources 61*a*, 61*b* and 61*c* are divided into P- and S-polarized lights, which are projected on the screen 67 as videos different by the parallax of the two eyes of a video observer. The video observer recognizes the above image as a 3D image by observing the videos while wearing a pair of glasses having polarization filters different for the two eyes.

In the above 3D display device, the laser lights need to be divided into different polarized lights. The above harmonic generator constructed to switch the laser optical path can be effectively used as the light sources of this 3D display device. In other words, by inserting a half wave plate 71 in one of two laser optical paths switched by the harmonic generator as shown in FIG. 20, two laser lights having different polarizations can be easily obtained.

Sixteenth Embodiment

Figure 21:
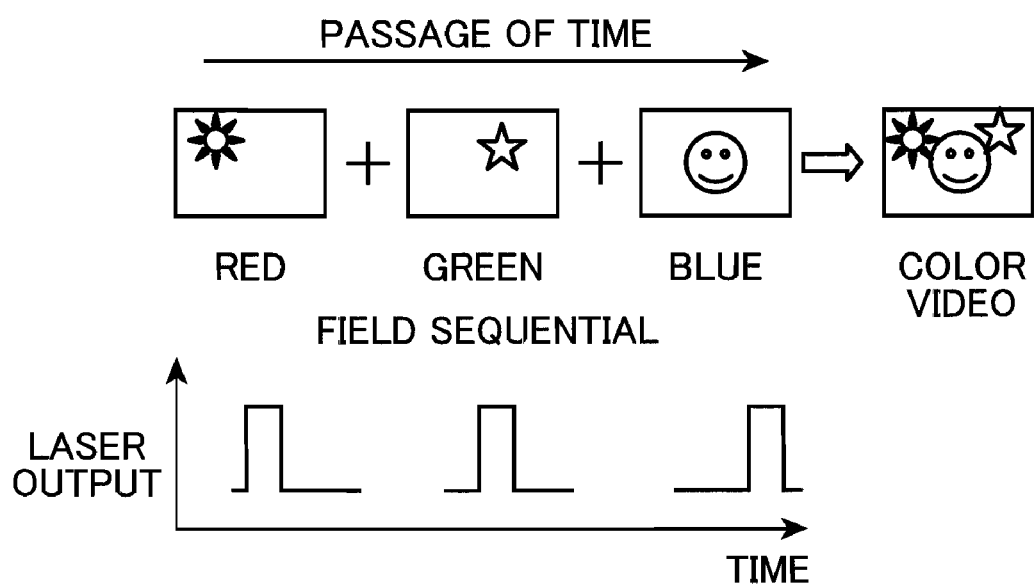
FIG. 21 is a chart showing a field sequential control executed by a display controller according to a sixteenth embodiment of the invention.

FIG. 21 is a diagram schematically showing a field sequential control executed by the display controllers 74 to 76 in the image display devices according to the eleventh to fifteenth embodiments.

The field sequential control is a control for successively turning red, green and blue images on to let the eyes of a video observer recognize as a color image. Since a frequency, at which the images of the respective colors are switched, is set to be sufficiently faster than the time resolution of human eyes, the video observer time-averages the images of the respective colors to recognize as the color image.

Specifically, in the case of executing a field sequential control by the display controller 74 to 76, there exists a timing at which the green image is not displayed as shown in FIG. 21. On the other hand, in the above harmonic generator, there exists a timing at which the output of the second harmonic by the harmonic generator is 0 in some cases in the case of displaying the focus position of the fundamental wave 50 to the poled-structure non-formation part 80 (see FIG. 3) and controlling the power of the fundamental wave 50 in accordance with the oscillation speed of the fundamental wave 50.

Accordingly, in this embodiment, the light source controller 73 according to the eleventh to fifteenth embodiments executes such a control to synchronize the timing at which the output of the light source 61*c* is 0 with the timing at which the image is not displayed by the field sequential control. In this way, a high-efficiency image display device can be realized effectively utilizing the timing at which the second harmonic is generated by the harmonic generator.

Seventeenth Embodiment

Figure 22:
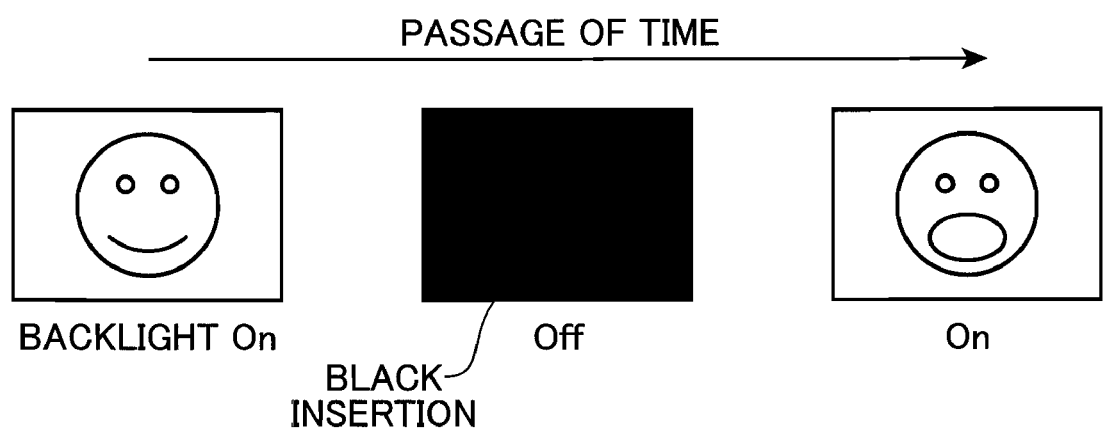
FIG. 22 is a chart showing a black insertion control executed by a display controller according to a seventeenth embodiment of the invention.
Figure 23:
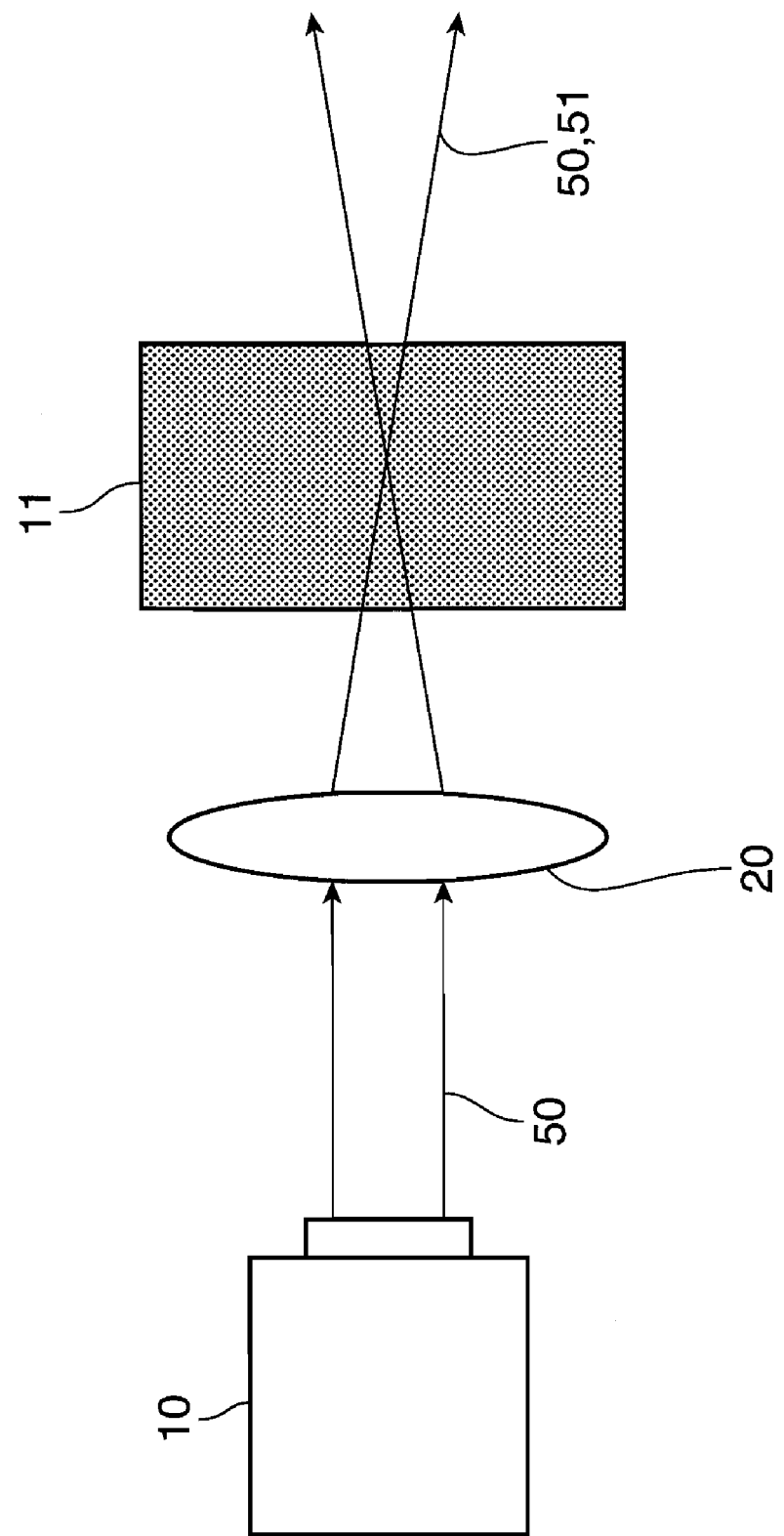
FIG. 23 is a diagram showing a conventional harmonic generator for obtaining a second harmonic from a fundamental wave.
Figure 24:
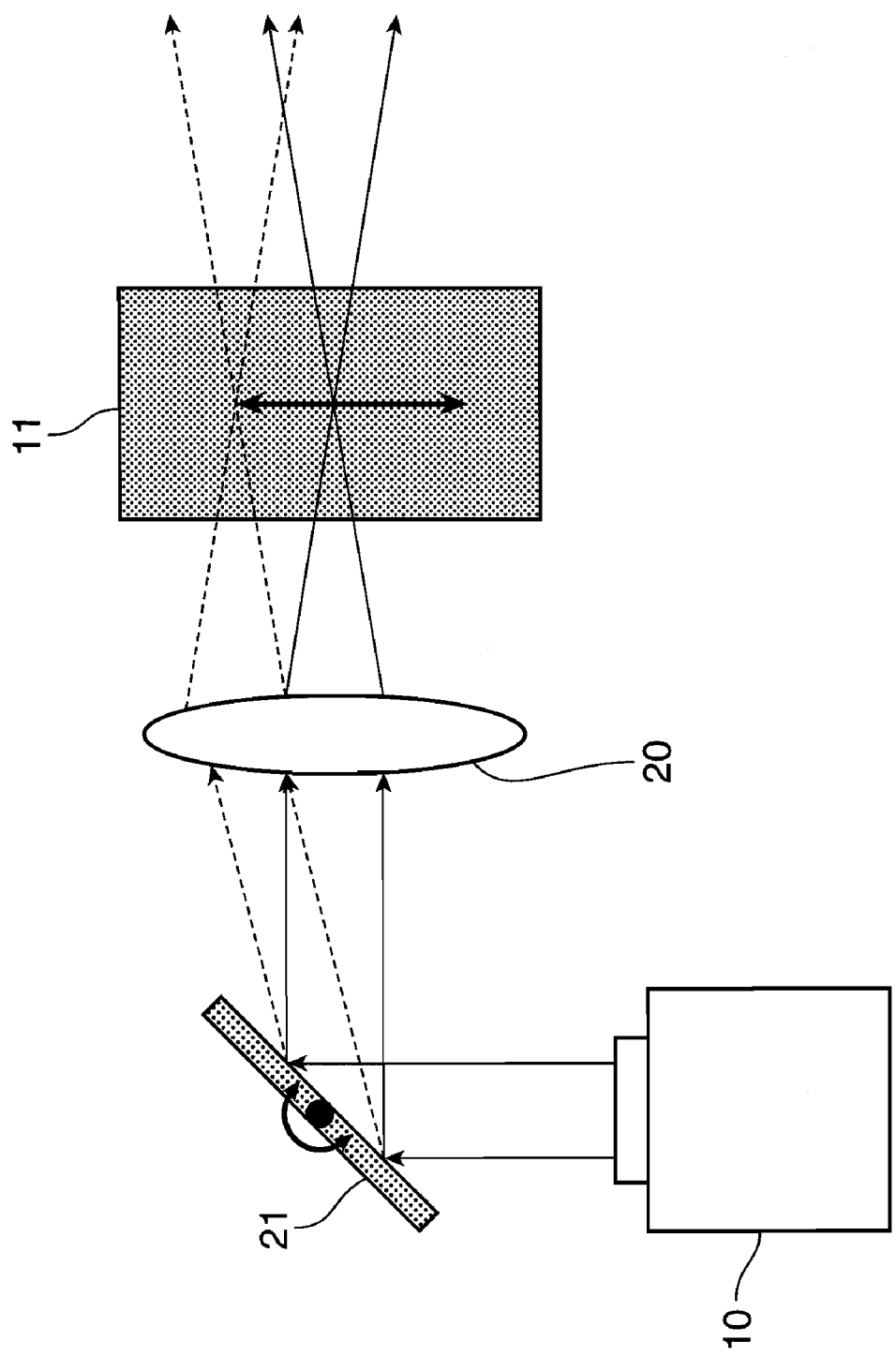
FIG. 24 is a diagram showing another conventional harmonic generator, in which a laser light is oscillated by a scanning mirror.

FIG. 22 is a diagram schematically showing a black insertion control executed by the light source controller 73 in the image display device according to the eleventh to fifteenth embodiments.

A liquid crystal panel generally has a problem of having an inferior moving image display performance due to a long response time of the liquid crystal itself. Accordingly, the moving image display performance is improved by executing the black insertion control by inserting a black image between consecutive ones of a plurality of images constituting moving images to be displayed.

Specifically, in the case of executing the black insertion control by the light source controller 73, there exists a timing at which backlights are turned off (outputs of the respective light sources 61*a* to 61*c* are 0) as shown in FIG. 22. On the other hand, in the above harmonic generator, there exists a timing at which the output of the second harmonic by the harmonic generator is 0 in the case of displacing the focus position of the fundamental wave 50 to the poled-structure non-formation part 80 (see FIG. 3) or controlling the power of the fundamental wave 50 in accordance with the oscillation speed of the fundamental wave 50.

Accordingly, in this embodiment, a control to synchronize the timing at which the output of the light source 61*c* is 0 and the timing at which the backlight is turned off by the black insertion control is executed by the light source controller 73 according to the eleventh to fifteenth embodiments. In this way, a high-efficiency image display device can be realized effectively utilizing the timing at which the second harmonic is generated by the harmonic generator.

The specific embodiments described above mainly embrace inventions having the following constructions.

In order to solve the above problems, a harmonic generator according to one aspect of the present invention comprises a laser light source for generating a laser light; a condensing member for condensing the laser light; a nonlinear crystal having a poled structure formed to be phase-matched with the laser light condensed by the condensing member; and a displacing member for relatively displacing a focus position of the laser light from the condensing member and the nonlinear crystal, wherein the displacing member relatively displaces the focus position and the nonlinear crystal such that, within an irradiation range set in the poled structure and having dimensions in a first direction parallel to an optical axis of the laser light from the condensing member and a second direction orthogonal to the first direction longer than a dimension in a third direction orthogonal to the first and second directions, the focus position of the laser light is oscillated at least in one of the first and second directions without stopping at the same position for longer than a predetermined period.

According to the present invention, a local increase of the power density of the laser light in the poled structure can be suppressed by relatively displacing the focus position of the laser light and the nonlinear crystal. Thus, an occurrence of UVIGA can be effectively suppressed to reduce a possibility of crystal breakdown. Hence, according to the present invention, the breakdown of the nonlinear crystal can be suppressed while the power of the laser light to be incident on the nonlinear crystal is increased, wherefore a maximum output of a second harmonic can be increased.

Further, according to the present invention, the generation efficiency of the second harmonic can be improved since a local temperature increase of the nonlinear crystal caused by the laser light can be suppressed. As a result of this improvement in efficiency, the power consumption of the harmonic generator can be reduced.

The expression "without stopping at the same position for longer than a predetermined period" in the present invention is to the effect that the focus position of the laser light is permitted to stop at the same position in the poled structure for such a period as not to cause the UVIGA. Specifically, the "predetermined period" is specified by the power density of the laser light and the composition of the nonlinear crystal.

Specifically, the displacing member can be constructed to oscillate at least either one of the focus position of the laser light and the nonlinear crystal in the second direction.

The displacing member can also be constructed to oscillate at least either one of the focus position of the laser light and the nonlinear crystal in the first direction.

In the harmonic generator for displacing the focus position of the laser light as described above, the displacing member preferably includes a shielding member for shielding an optical path of the laser light when the focus position of the laser light reaches a turning point of the oscillation.

According to this construction, the irradiation of the laser light to the nonlinear crystal can be prevented by the shielding member at the turning points of the oscillation where the relative moving speed of the focus position of the laser light and the nonlinear crystal is slowed. Thus, a local enhancement of the power density in the nonlinear crystal can be suppressed.

In the harmonic generator for displacing the focus position of the laser light as described above, the displacing member preferably relatively oscillates the focus position of the laser light and the nonlinear crystal such that the focus position of the laser light is turned back at positions outside the poled structure of the nonlinear crystal.

According to the above construction, since the displacement range of the focus position of the laser light is set larger than the width of the poled structure, the turning points where the oscillation speed of the focus position of the laser light is slowed are located outside the poled structure. Therefore, according to the above construction, a local enhancement of the power density by the laser light in the poled structure can be suppressed.

In the above harmonic generator, it is preferable that the displacing member includes two or more oscillation systems for oscillating at least one of the focus position of the laser light and the nonlinear crystal substantially in the same cycle; and that the phases of the respective oscillation systems are different.

According to the above construction, since the phases of the two or more oscillation systems are different, even if one oscillation system is resting, the oscillation by the other oscillation system(s) is carried out, whereby the focus position of the laser light and the nonlinear crystal can be constantly relatively displaced. Therefore, a local enhancement of the power density by the laser light in the poled structure can be suppressed.

In the above harmonic generator, the displacing member preferably two-dimensionally displaces the focus position of the laser light.

According to the above construction, the power density in the nonlinear crystal by the laser light can be more effectively distributed.

Specifically, the displacing member may be constructed to displace the focus position of the laser light such that the locus of the focus position of the laser light describes Lissajous curves.

In the above harmonic generator, it is preferable that the nonlinear crystal is made of Mg-doped $LiNbO_3$; that the displacing member includes a displacement mechanism for relatively displacing the focus position of the laser light and the nonlinear crystal and a controller for controlling the displacement mechanism in such a manner as to exceed a relative displacement speed of the focus position of the laser light and the nonlinear crystal, at which speed a value obtained by dividing a maximum laser power density of the laser light in the irradiation range by the relative displacement is 15 $[J/mm^2]$.

According to the above construction, the focus position of the laser light and the nonlinear crystal can be relatively displaced at such a speed capable of avoiding the breakdown of the nonlinear crystal by the UVIGA. Specifically, the breakdown of the nonlinear crystal by the UVIGA is thought to occur when an amount of heat generation per unit time in the nonlinear crystal exceeds a predetermined value. It has been confirmed that the breakdown starts in the nonlinear crystal made of Mg-doped $LiNbO_3$ when the value obtained by dividing the maximum power density of the laser light by the relative displacement speed of the focus position of the laser light and the nonlinear crystal is equal to or greater than 15 $[J/mm^2]$. In the above construction, the focus position of the laser light and the nonlinear crystal can be displaced at such a speed as to set the above value below 15 $[J/mm^2]$, wherefore the breakdown of the nonlinear crystal can be prevented.

A harmonic generator according to another aspect of the present invention comprises a laser light source for generating a laser light; a nonlinear crystal having a poled structure formed to be phase-matched with the laser light; a displacing member for relatively displacing a focus position of the laser light and the nonlinear crystal such that an optical path of the laser light moves in the poled structure, and power control means for controlling the power of the laser light in accordance with a relative displacement speed of the optical path of the laser light and the nonlinear crystal such that a power density in the poled structure is equal to or below a predetermined value.

According to the present invention, an occurrence of the UVIGA can be effectively suppressed to reduce a possibility of crystal breakdown since a local enhancement of the power density in the poled structure can be suppressed by controlling the power of the laser light. Thus, according to the present invention, the breakdown of the nonlinear crystal can be suppressed while the power of the laser light incident on the nonlinear crystal is kept large, wherefore a maximum output of a second harmonic can be increased.

Further, since a local temperature increase of the nonlinear crystal by the laser light can be suppressed in the present invention, the generation efficiency of the second harmonic can be improved. As a result of this improvement in efficiency, the power consumption of the harmonic generator can be reduced.

It should be noted that the "predetermined value" in the present invention means the value of such a maximum power density as not to cause the UVIGA and is specified by the displacement speed of the optical path of the laser light and the nonlinear crystal and the composition of the nonlinear crystal.

Specifically, if the nonlinear crystal is made of Mg-doped $LiNbO_3$, the power control means can control the power of the laser light to be below a laser power density at which a value obtained by dividing the power density of the laser light in the poled structure by the relative displacement speed of the optical path of the laser light and the nonlinear crystal is 15 [J/mm$^2$].

Then, a power control can be executed which can avoid the breakdown of the nonlinear crystal by the UVIGA. Specifically, the breakdown of the nonlinear crystal by the UVIGA is thought to occur when an amount of heat generation per unit time in the nonlinear crystal exceeds a predetermined value. It has been confirmed that the breakdown starts in the nonlinear crystal made of Mg-doped LiNbO$_3$ when the value obtained by dividing the power density of the laser light by the relative displacement speed of the focus position of the laser light and the nonlinear crystal is equal to or greater than 15 [J/mm$^2$]. Accordingly, in the above construction, the power of the laser light can be controlled to have such a power density at which the above value can be below 15 [J/mm$^2$], wherefore the breakdown of the nonlinear crystal can be prevented.

A harmonic generator according to still another aspect of the present invention comprises a laser light source for generating a laser light; a nonlinear crystal having a poled structure formed to be phase-matched with the laser light; and a displacing member for switching an optical path of the laser light relative to the nonlinear crystal in the poled structure of the nonlinear crystal in such a manner as not to stop the optical path of the laser light at the same position for longer than a predetermined period.

According to the present invention, an occurrence of the UVIGA can be effectively suppressed to reduce a possibility of crystal breakdown since a local enhancement of the power density of the laser light in the poled structure can be suppressed by switching the optical path of the laser light. Thus, according to the present invention, the breakdown of the nonlinear crystal can be suppressed while the power of the laser light incident on the nonlinear crystal is kept large, wherefore a maximum output of a second harmonic can be increased.

Further, since a local temperature increase of the nonlinear crystal by the laser light can be suppressed in the present invention, the generation efficiency of the second harmonic can be improved. As a result of this improvement in efficiency, the power consumption of the harmonic generator can be reduced.

The expression "not to stop at the same position for longer than a predetermined period" in the present invention is to the effect that the optical path of the laser light is permitted to stop at the same position in the poled structure for such a period as not to cause the UVIGA. Specifically, the "predetermined period" is specified by the power density of the laser light and the composition of the nonlinear crystal.

In the above harmonic generator, the displacing member preferably includes an optical element capable of adjusting a diffraction angle upon receiving a control signal.

According to the above construction, the optical path of the laser light can be changed or switched by feeding a control signal.

In the above harmonic generator, the displacing member is preferably so constructed as to locate the optical path of the laser light outside the nonlinear crystal in a state where the optical path of the laser light and the nonlinear crystal are not relatively displaced.

According to the above construction, the irradiation of the laser light to the nonlinear crystal can be prevented even if the laser light should be irradiated before the relative displacement of the optical path of the laser light and the nonlinear crystal by the displacing member is started, wherefore the breakdown of the nonlinear crystal can be more effectively suppressed.

In the above harmonic generator, a harmonic output of the harmonic generator is 3 W or higher.

In the harmonic generator, the material composition of the nonlinear crystal is Mg-doped LiNbO$_3$.

In the above harmonic generator, the wavelength of the laser light generated by the laser light source may be 1064 nm (inclusive) to 1070 (inclusive) and the wavelength of the harmonic obtained from the nonlinear crystal may be 532 nm (inclusive) to 535 (inclusive).

An image display device according to further another aspect of the present invention comprises the above harmonic generator; a spatial modulation element for converting a laser light generated by the harmonic generator into an image; and a display controller for controlling an image conversion by the spatial modulation element.

According to the image display device of the present invention, a compact and high-output green laser light source using, for example, an infrared semiconductor laser as a fundamental wave light source can be realized by using the harmonic generator. Thus, an image display with high luminance and good color reproducibility can be realized. Further, since the optical path of the laser light source or the nonlinear crystal is displaced, no large-scale construction for reducing speckle noise is necessary unlike the case where a screen is oscillated. Therefore, according to the present invention, the speckle noise can be reduced while the smaller size, lower power and lower cost are promoted.

In the above image display device, it is preferable that the display controller is so constructed as to execute a field sequential control for displaying an image while sequentially switching a plurality of colors constituting the image at unit time intervals; and that a timing at which the output of the laser light generated by the harmonic generator is lowest and a non-display timing at which the color corresponding to the laser light in the field sequential control is not displayed are synchronized.

According to this construction, a local enhancement of the power density of the laser light in the nonlinear crystal can be suppressed by effectively utilizing the non-display timing in the field sequential control. Thus, according to the present invention, a high-luminance image display device can be realized while the breakdown of the nonlinear crystal by the UVIGA is suppressed.

In the above image display device, it is preferable that the display controller controls the insertion of a black image between two consecutive ones of a plurality of images to be displayed; and that a timing at which the output of the laser light generated by the harmonic generator is lowest and an insertion timing of the black image are synchronized.

According to the above construction, a local enhancement of the power density of the laser light in the nonlinear crystal can be suppressed by effectively utilizing the insertion timing of the black image. Thus, according to the present invention, a high-luminance image display device can be realized while the breakdown of the nonlinear crystal by the UVIGA is suppressed.

If the image display device is constructed to include the above harmonic generator and a liquid crystal panel for converting a laser light generated by the harmonic generator into an image, the laser light generated by the harmonic generator can be used as a backlight for the liquid crystal panel.

If the image display device is constructed to include the above harmonic generator, a light guide plate on which a laser light emitted from the harmonic generator is to be incident and a liquid crystal panel for converting the laser light introduced by the light guide plate into an image, the light guide plate irradiated with the laser light from the harmonic generator can be used as a backlight for the liquid crystal panel.

The image display device may also be constructed to include the above harmonic generator, a polygonal mirror for diffusing a laser light emitted from the harmonic generator and a light guide plate on which the laser light diffused by the polygonal mirror is to be incident.

The laser light may be diffused using a line diffuser instead of the polygonal mirror to be incident on the light guide plate.

The image display device may also be constructed to include the above harmonic generator and a scanning optical system for scanning a laser light emitted from the harmonic generator.

By using the above-described inventive constructions, a high-output and high-efficiency second harmonic can be obtained from the nonlinear crystal having the poled structure. In the case of outputting a green second harmonic, a compact green laser light source is possible and useful for backlights of liquid crystal televisions, projection televisions and projectors that require a compact and high-output light source.

This application is based on Japanese Patent Application No. 2007-056992 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A harmonic generator, comprising:
    a laser light source for generating a laser light;
    a condensing member for condensing the laser light;
    a nonlinear crystal having a poled structure formed to be phase-matched with the laser light condensed by the condensing member; and
    a displacing member for relatively displacing a focus position of the laser light from the condensing member and the nonlinear crystal,
    wherein the poled structure has a structure in which poled portions are arranged and equally spaced in a first direction parallel to an optical axis of the laser light from the condensing member, and the poled portions extend in a second direction orthogonal to the first direction, and the poled portions are unequally spaced in a third direction orthogonal to the first and second directions,
    wherein in the poled structure, an irradiation range is set which has a wavelength conversion efficiency of 90% or higher of a maximum conversion efficiency of a wavelength conversion element so that a dimension in the first direction and the dimension in the second direction become larger than the dimension in the third direction, and
    wherein the displacing member relatively displaces the focus position and the nonlinear crystal such that, within the irradiation range, the focus position of the laser light is oscillated at least in one of the first and second directions without stopping at the same position for longer than a predetermined period.

2. A harmonic generator according to claim 1, wherein the displacing member oscillates at least either one of the focus position of the laser light and the nonlinear crystal in the second direction.

3. A harmonic generator according to claim 1, wherein the displacing member oscillates at least either one of the focus position of the laser light and the nonlinear crystal in the first direction.

4. A harmonic generator according to claim 1, wherein the displacing member includes a shielding member for shielding an optical path of the laser light when the focus position of the laser light reaches a turning point of the oscillation.

5. A harmonic generator according to claim 1, wherein the displacing member relatively oscillates the focus position of the laser light and the nonlinear crystal such that the focus position of the laser light is turned back at positions outside the poled structure of the nonlinear crystal.

6. A harmonic generator according to claim 1, wherein:
    the displacing member includes two or more oscillation systems for oscillating at least one of the focus position of the laser light and the nonlinear crystal substantially in the same cycle; and
    the phases of the respective oscillation systems are different.

7. A harmonic generator according to claim 1, wherein the displacing member two-dimensionally displaces the focus position of the laser light.

8. A harmonic generator according to claim 7, wherein the displacing member displaces the focus position of the laser light such that the locus of the focus position of the laser light describes Lissajous curves.

9. A harmonic generator according to claim 1, wherein:
    the nonlinear crystal is made of Mg-doped $LiNbO_3$; and
    the displacing member includes a displacement mechanism for relatively displacing the focus position of the laser light and the nonlinear crystal and a controller for controlling the displacement mechanism in such a manner as to exceed a relative displacement speed of the focus position of the laser light and the nonlinear crystal, at which speed a value obtained by dividing a maximum laser power density of the laser light in the irradiation range by the relative displacement is 15 $[J/mm^2]$.

10. A harmonic generator, comprising:
    a laser light source for generating a laser light;
    a nonlinear crystal having a poled structure formed to be phase-matched with the laser light; and
    a displacing member for relatively displacing a focus position of the laser light and the nonlinear crystal such that an optical path of the laser light moves in the poled structure,
    wherein the displacing member includes:
        a speed controller for controlling a relative displacement speed of the optical path of the laser light and the nonlinear crystal; and
        a power controller for calculating an intensity of the laser light at which a power density in the poled structure is equal to or below a predetermined value in accordance with the relative displacement speed controlled by the speed controller and controlling the power of the laser light in accordance with the intensity of the laser light.

11. A harmonic generator according to claim 10, wherein:
    the nonlinear crystal is made of Mg-doped $LiNbO_3$; and
    the power controller controls the power of the laser light to be below a laser power density at which a value obtained by dividing the power density of the laser light in the poled structure by the relative displacement speed of the optical path of the laser light and the nonlinear crystal is 15 $[J/mm^2]$.

12. A harmonic generator according to claim 1, wherein the displacing member includes an optical element capable of adjusting a diffraction angle upon receiving a control signal.

13. A harmonic generator according to claim 1, wherein the displacing member is so constructed as to locate the optical path of the laser light outside the nonlinear crystal in a state where the optical path of the laser light and the nonlinear crystal are not relatively displaced.

14. An image display device, comprising:
a harmonic generator according to claim 1;
a spatial modulation element for converting a laser light generated by the harmonic generator into an image; and
a display controller for controlling an image conversion by the spatial modulation element.

15. An image display device according to claim 14, wherein:
the display controller is so constructed as to execute a field sequential control for displaying an image while sequentially switching a plurality of colors constituting the image at unit time intervals; and
a timing at which the output of the laser light generated by the harmonic generator is lowest and a non-display timing at which the color corresponding to the laser light in the field sequential control is not displayed are synchronized.

16. An image display device according to claim 14, wherein:
the display controller controls the insertion of a black image between two consecutive ones of a plurality of images to be displayed; and
a timing at which the output of the laser light generated by the harmonic generator is lowest and an insertion timing of the black image are synchronized.

17. An image display device, comprising:
a harmonic generator according to claim 10;
a spatial modulation element for converting a laser light generated by the harmonic generator into an image; and
a display controller for controlling an image conversion by the spatial modulation element.

18. An image display device according to claim 17, wherein:
the display controller is so constructed as to execute a field sequential control for displaying an image while sequentially switching a plurality of colors constituting the image at unit time intervals; and
a timing at which the output of the laser light generated by the harmonic generator is lowest and a non-display timing at which the color corresponding to the laser light in the field sequential control is not displayed are synchronized.

19. An image display device according to claim 17, wherein:
the display controller controls the insertion of a black image between two consecutive ones of a plurality of images to be displayed; and
a timing at which the output of the laser light generated by the harmonic generator is lowest and an insertion timing of the black image are synchronized.

* * * * *